(12) United States Patent
Tackes et al.

(10) Patent No.: US 8,322,372 B2
(45) Date of Patent: Dec. 4, 2012

(54) FLOW FORCE REDUCTION BY INCREMENTAL PRESSURE DROP

(76) Inventors: John N. Tackes, Rockford, IL (US); Jesse O. Arias, Round Lake, IL (US)

(*) Notice: Subject to any disclaimer, the term of this patent is extended or adjusted under 35 U.S.C. 154(b) by 49 days.

(21) Appl. No.: 12/786,319

(22) Filed: May 24, 2010

(65) Prior Publication Data
US 2010/0229983 A1    Sep. 16, 2010

Related U.S. Application Data

(62) Division of application No. 11/500,635, filed on Aug. 8, 2006, now Pat. No. 7,766,041.

(51) Int. Cl.
*F16K 11/07* (2006.01)
(52) U.S. Cl. ............... 137/625.3; 137/625.35; 251/117
(58) Field of Classification Search .......... 137/625.3, 137/625.35, 625.38, 625.39; 251/117, 118, 251/120
See application file for complete search history.

(56) References Cited

U.S. PATENT DOCUMENTS

| | | | |
|---|---|---|---|
| 1,859,876 A | 5/1932 | Koplin | |
| 2,596,534 A | 5/1952 | Crake | |
| 2,836,198 A | 5/1958 | McNeill | |
| 2,964,023 A | 12/1960 | Meulendyk | |
| 3,912,222 A | 10/1975 | Hayner | |
| 3,990,475 A | 11/1976 | Myers | |
| 4,050,476 A | 9/1977 | Hayner et al. | |
| 4,122,868 A | 10/1978 | Holloway et al. | |
| 4,126,155 A | 11/1978 | Bertram | |
| 4,245,816 A | 1/1981 | Johnson | |
| 4,325,412 A | 4/1982 | Hayner | |
| 4,411,189 A | 10/1983 | Miller | |
| 4,750,511 A | 6/1988 | Henry et al. | |
| 4,862,920 A | 9/1989 | Cleasby | |
| 5,351,717 A | 10/1994 | Saito | |
| 6,397,890 B1 | 6/2002 | Mickelson et al. | |

OTHER PUBLICATIONS

D. McLoy, H.R. Martin; "The Control of Fluid Power", 1973, Sections 4.3.1 & 4.3.2; Longman Group LTD, London.
Herbet E. Merritt, "Hydraulic Control Systems", 1967, pp. 40-43, 100-109, John Wiley & Sons.
J.F. Blackburn, J.L. Coakley, F.D. Ezekiel; "Fluid Power Control", 1960; Section 10.321, M.I.T. Press.

*Primary Examiner* — John Fox

(57) ABSTRACT

A fluid flow control device for improving, for example, valve operation by reducing "error forces" occurring due to fluid communication between ports of a valve having two or more ports. Incremental pressure drop passages bleed incrementally the flow of fluid between first an second ports as the valve spool is moving between the first and second positions to decrease the pressure differential generated force exerted on the spool whereby the energy required to be applied to the spool for moving the spool between the first and second positions is decreased.

20 Claims, 22 Drawing Sheets

DG-S4B

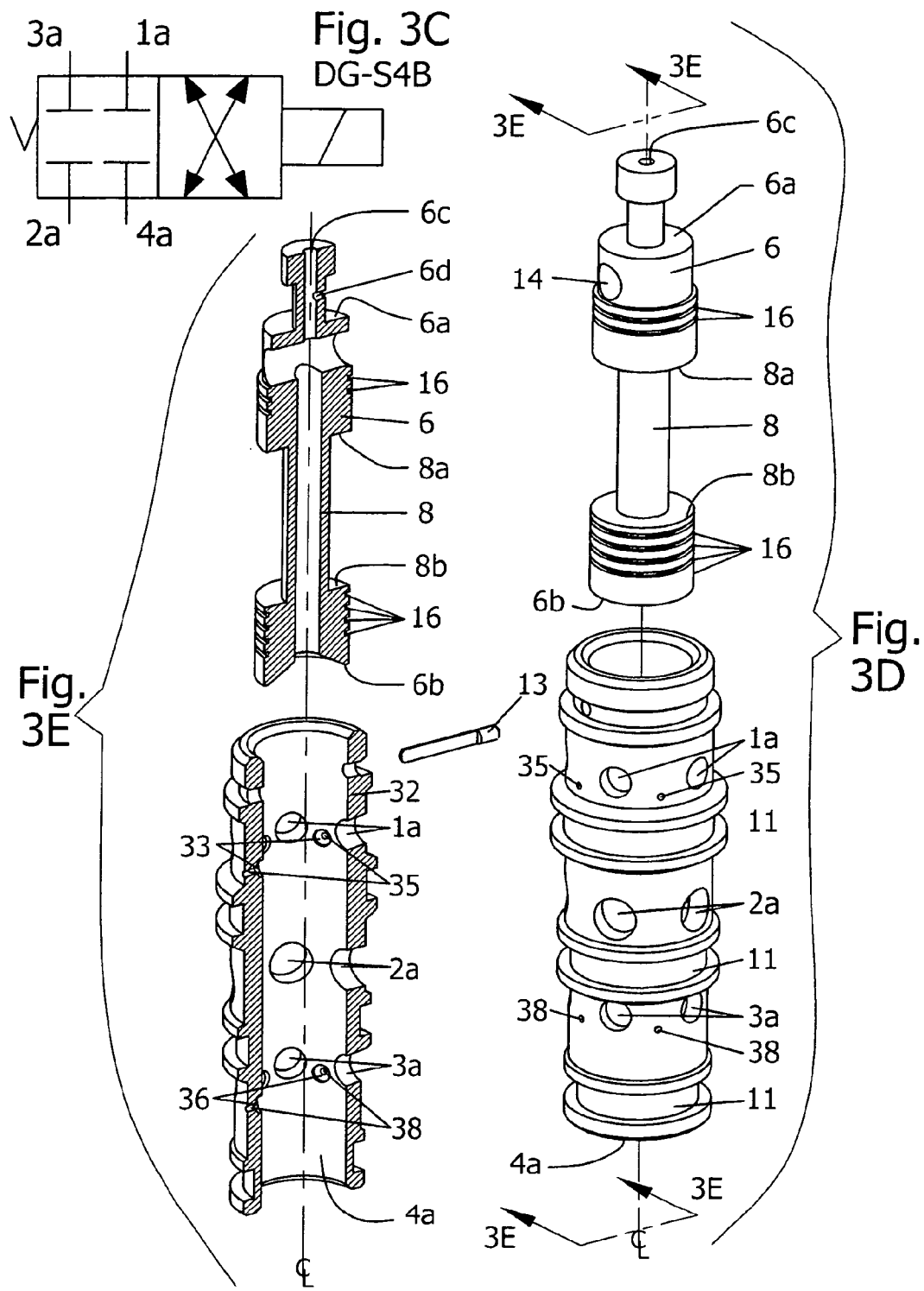

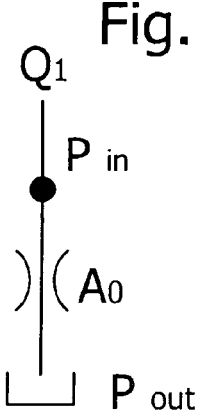
CONVENTIONAL METERING
ORIFICE DIAGRAM
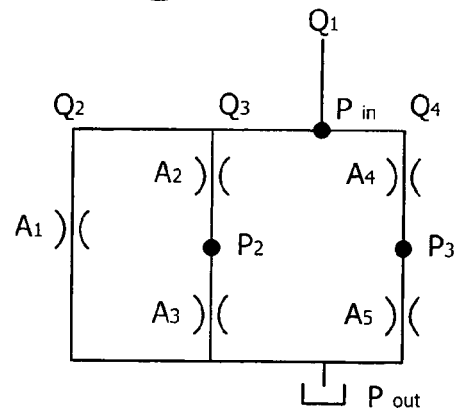
INCREMENTAL METERING
ORIFICE DIAGRAM
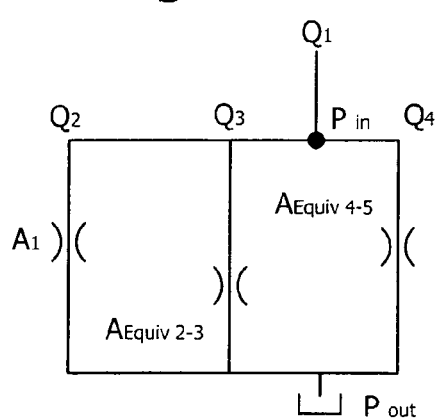
INCREMENTAL METERING
REDUCED ORIFICE
DIAGRAM 1
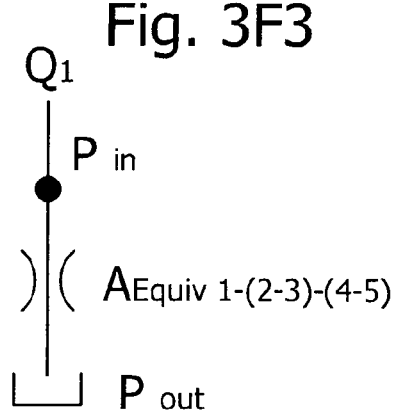
INCREMENTAL METERING
REDUCED ORIFICE
DIAGRAM 2

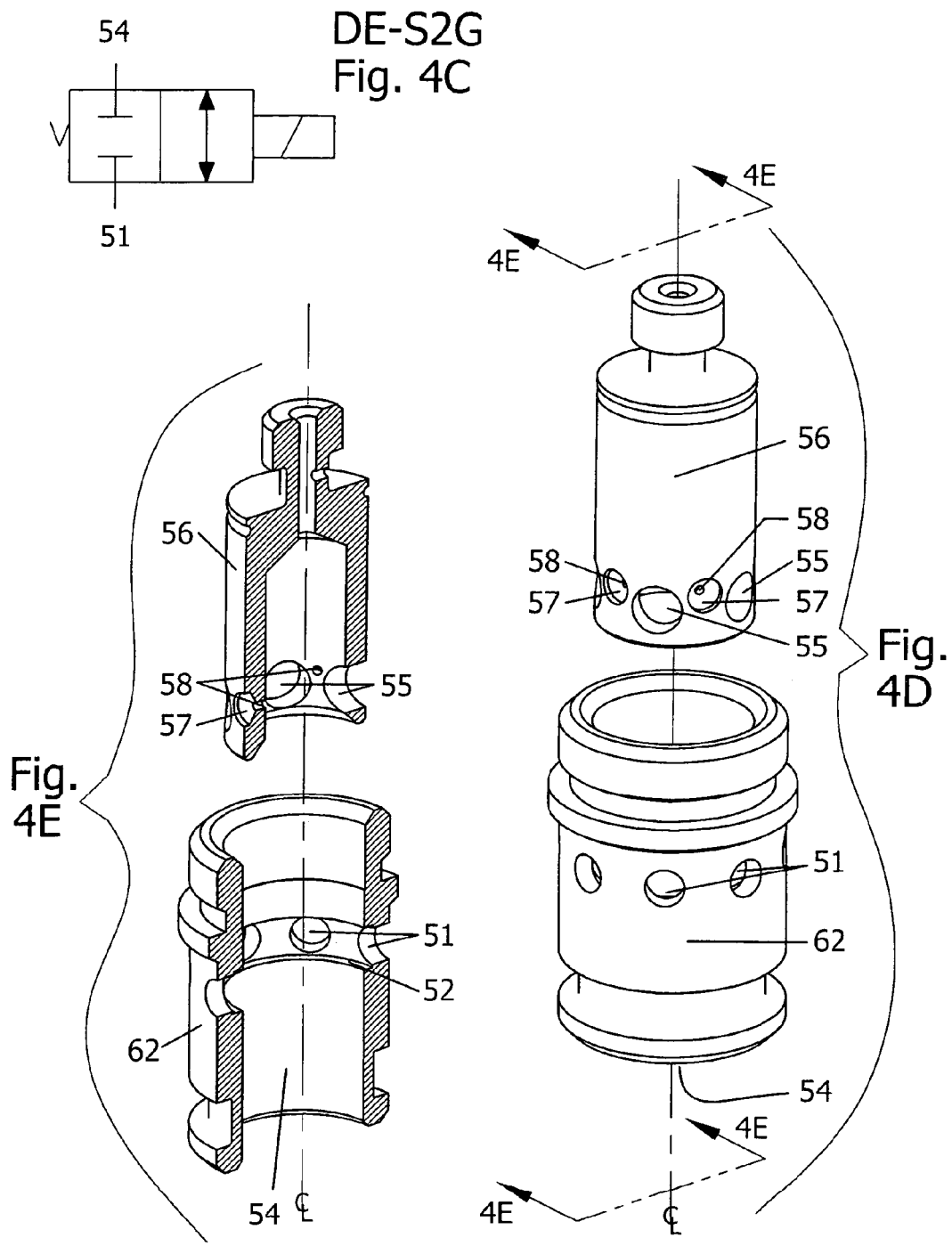

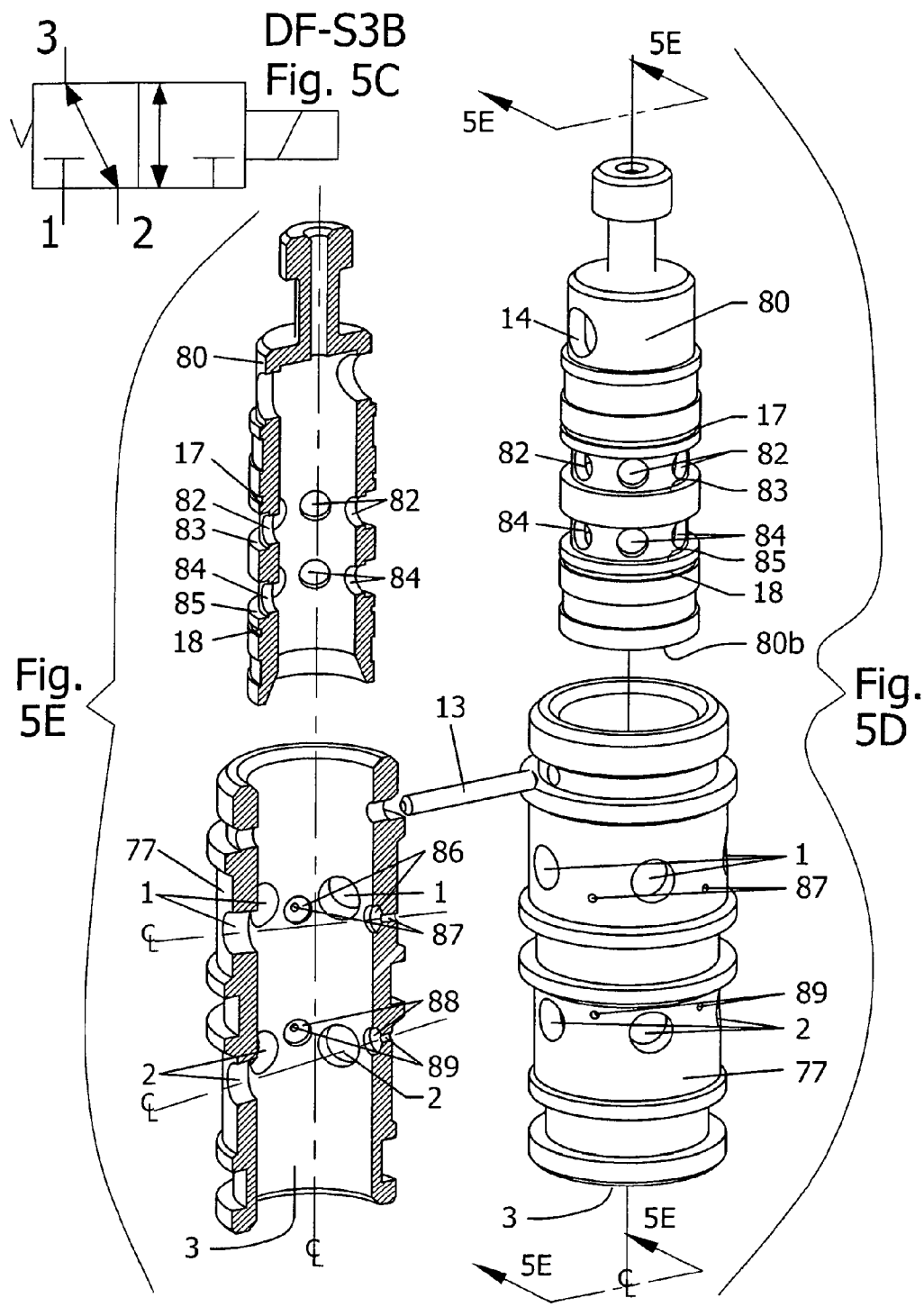

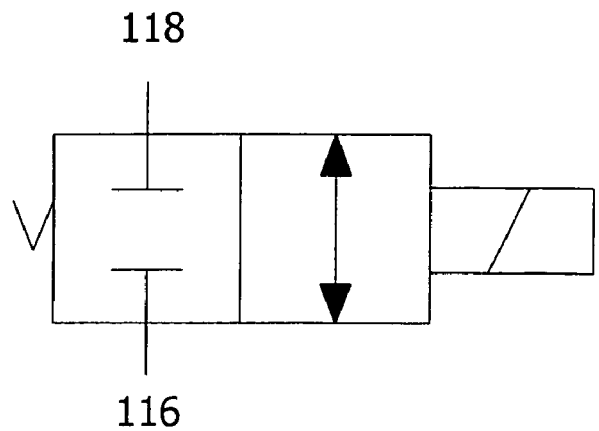
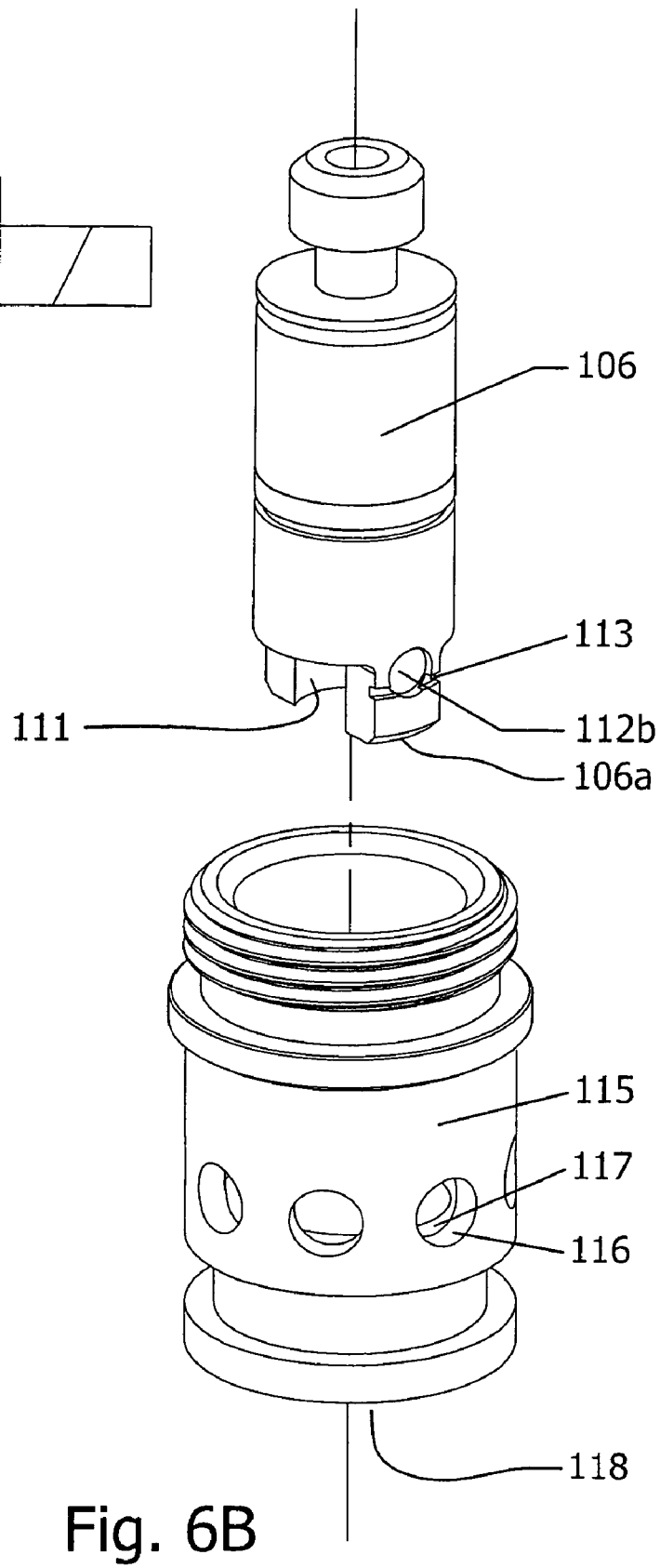
Fig. 6C
Fig. 6B

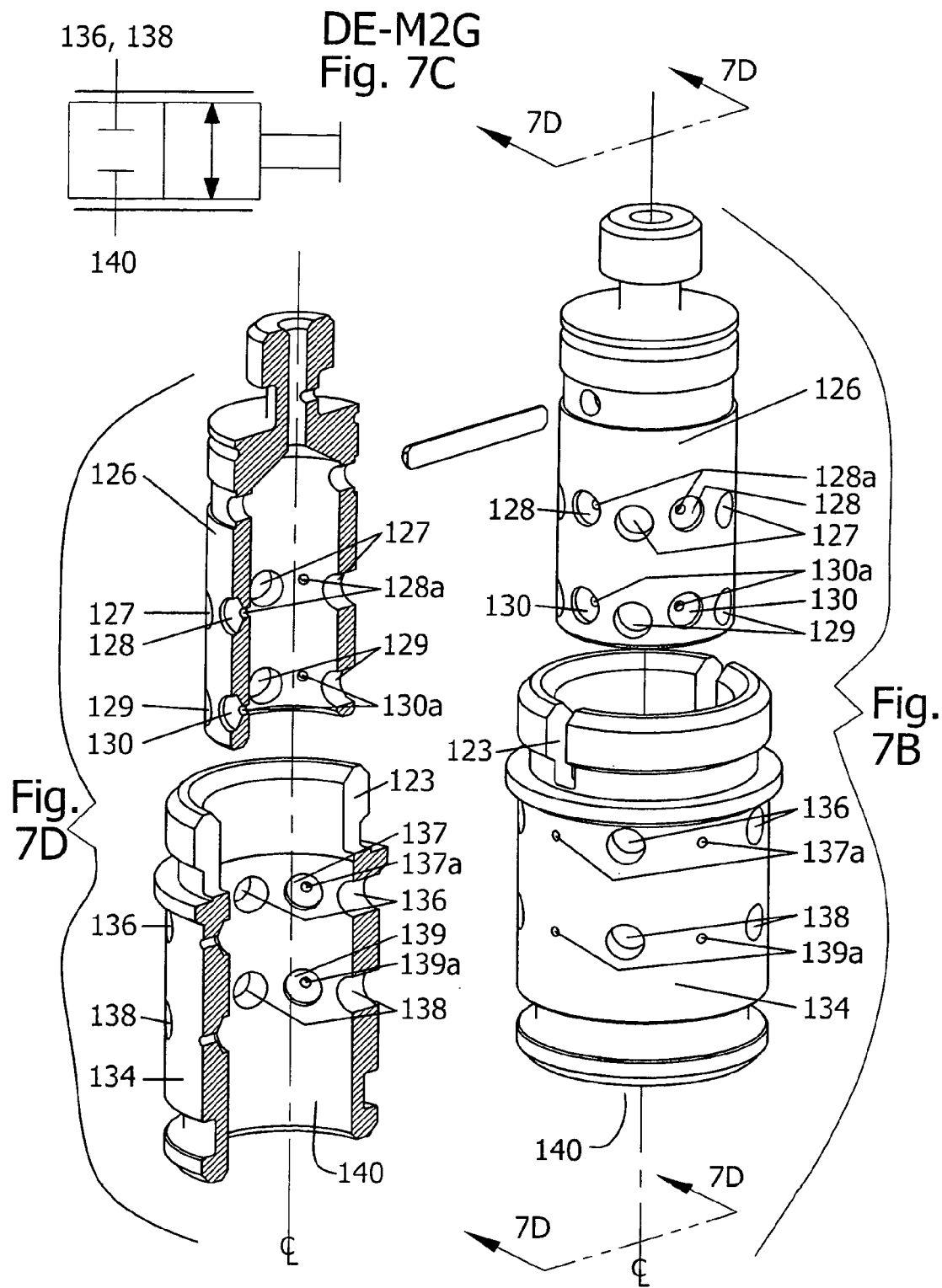

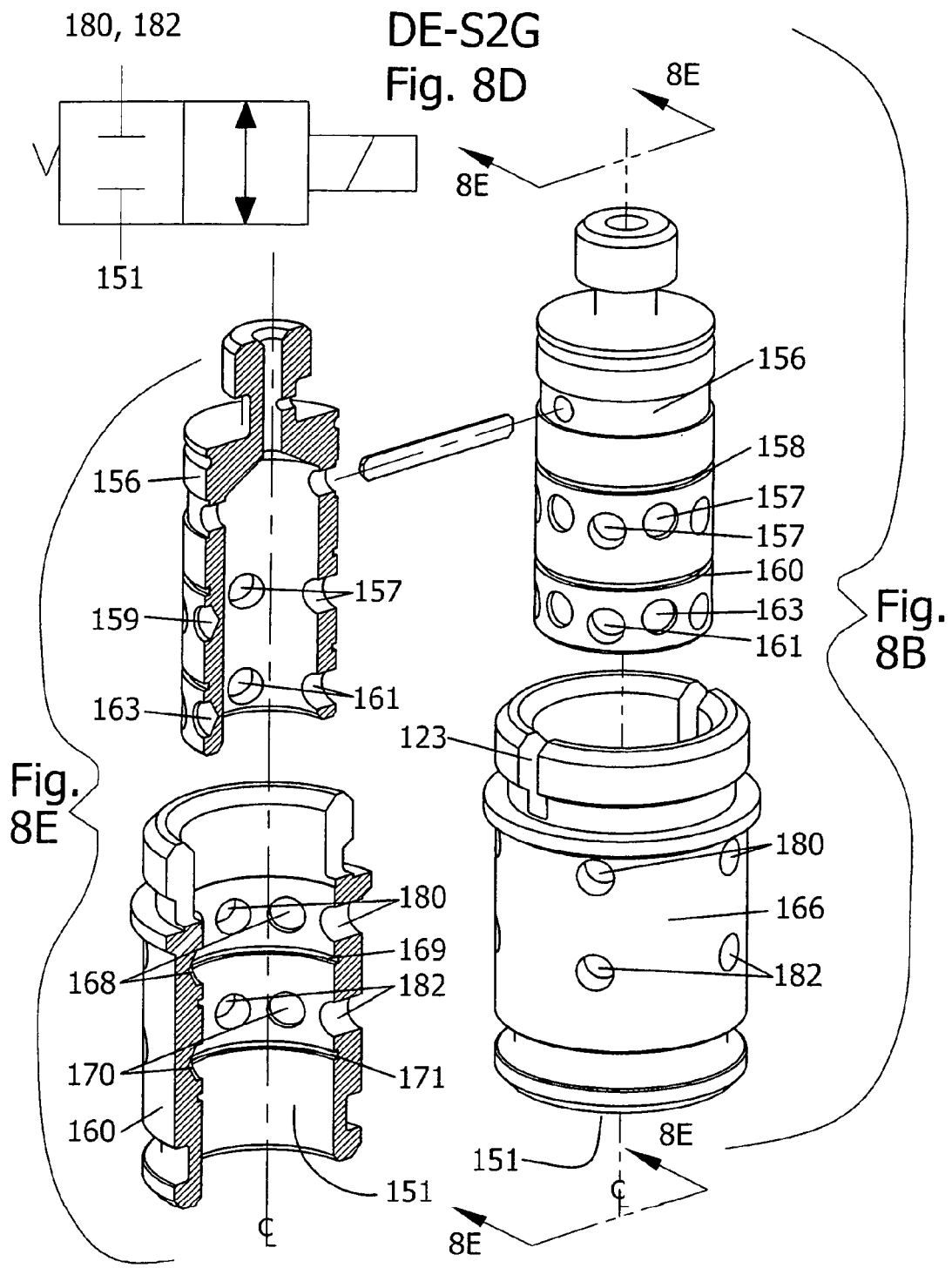

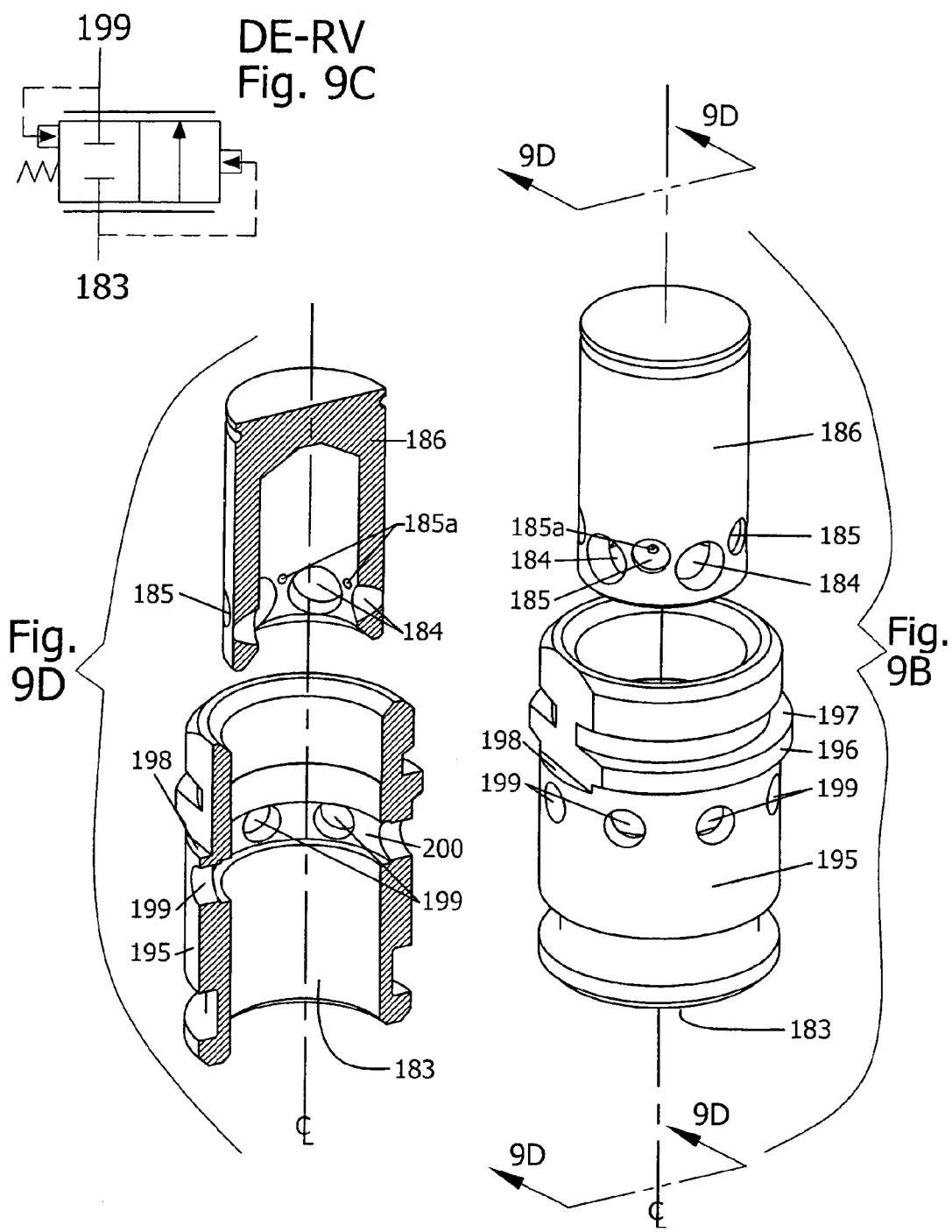

FLOW FORCE REDUCTION BY INCREMENTAL PRESSURE DROP

CROSS-REFERENCE TO RELATED PATENT APPLICATIONS

This application is a divisional application of U.S. Ser. No. 11/500,635 entitled FLOW FORCE REDUCTION BY INCREMENTAL PRESSURE DROP filed Aug. 8, 2006 incorporated herein by reference in its entirety.

BACKGROUND OF THE INVENTION

1. Field of the Invention

The present invention relates to apparatus in flow distribution device(s) for reducing the force necessary for opening or closing other apparatus subject to fluid pressure differentials and flow created forces, while simultaneously reducing the potential for oscillation and/or pressure pulsations or ripples at the metering element, including reduced metering edge wear; and more particularly relates to apparatus for reducing the amount of force necessary to open and close off fluid flow in various fluid flow arrangements, particularly in devices with valve like function arrangements.

2. Background of the Invention

Numerous attempts have been made in the past to facilitate the opening and closing of various valve arrangements to increase the flow conditions of the valve. Some of those attempts have merely been to increase the energy put into the valve actuating mechanism by, for example, increasing the current through an actuating solenoid. Other attempts to reduce the force necessary for such opening or closing have been exhibited in such activities of Hayner in U.S. Pat. No. 4,325,412 by centering the valve spool in the valve sleeve and to the employment of an "anti flow device" to reduce spool actuating forces.

As discussed in Section 5.6 of "*Hydraulic Control Systems*", Herbert E. Merritt, John Wiley & Sons, 1967, flow forces on spool valves are generally referred to as "flow induced forces", "Bernoulli forces", or "hydraulic reaction forces." Other writers have referred to these forces as "error forces", i.e. forces that are caused by the structure and function of the valve which were not generally intended, and result in the necessity of increased opening and closing forces on the valve. However, all of these names are applied to those forces which act upon a valve as a result of fluid flowing in the valve chambers and through the valve openings or orifices.

Other techniques covered by P. Hayner in U.S. Pat. No. 4,325,412 & R. Mickelson in U.S. Pat. No. 6,397,890 all have attempted to reduce such forces. However, the Series & Parallel passages suggested in Hayner while including a circumferential balancing of the valve spool for centering purposes, does not include using the centering passages as part of the series fluid bleed passages represented by the force reducing geometry of the present invention. Moreover, Staggered holes, & or notches of various geometries in similar manner to the R. Mickelson patent, have been utilized, but none of these utilize series incremental pressure drop passages which are employed as a feature of the present invention. As shall be more completely recognized in the following discussion, the present invention includes series and/or parallel feed and/or bleed passages. In the convention of hydraulics, "feed" means a flow from a "source" to "work port" (intermediate pressure) and "bleed" means from "source" or "work port" to "tank". However, hereinafter the term "bleed" shall be used generically to merely refer to a passage from a higher pressure to a lower pressure.

Staggered hole & flow force compensation techniques have been outlined in Textbook Sections 4.3.1 & 4.3.2. of "The Control of Fluid Power" D. McCloy, H. R. Martin, Longman Group LTD. London, 1973; and Section 10.321 of "Fluid Power Control" J. F. Blackburn, J. L. Coakley, F. D. Ezekiel, M.I.T. Press, 1960. Particularly, Parallel passages are described within section 4.3.1 of the McCloy text but again this technique does not utilize series incremental pressure drop passages.

SUMMARY OF THE INVENTION

In view of the above, it is a principal object of the present invention to provide, in devices (for example a hydraulic valve) in which fluid pressure or flow is such as to require high levels of energy for redirecting or shutting off the flow or reducing fluid pressure, apparatus which requires lower energy or power requirements to effect such flow redirection or pressure reduction, operative in a gradual manner even in proportional actuated devices.

Yet another object of the present invention is to provide apparatus in a valve or the like which allows the valve actuating means, (e.g. solenoid and/or motor) to be smaller and require less energy consumption for opening and closing of the valve fluid flow ports.

Another object of the present invention is to provide apparatus in a fluid flow device in which the return to neutral position of the device or actuation of the device through to its maximum opening is smoother and inhibits unwanted oscillations and/or pressure pulsations at flow extremes while reducing metering edge wear.

Still another object of the present invention is to provide improved valves for fluid flow which are easily fabricated and which allow for improved operation over increased operating ranges at lower operating costs than existing valve arrangements.

Yet another object of the present invention is to provide improved valve operation by reducing flow induced forces, Bernoulli forces, or hydraulic reaction forces in the valve at various operating conditions.

The above objects are met by providing incremental pressure drop passages for decreasing flow induced error forces. In certain of the embodiments, a series of bleed like orifices operate as the spool is moving in response to energization, the orifices starting to open in advance of the full opening of the fluid flow passages effecting a first gradual pressure or force drop decreasing the flow induced, Bernoulli or hydraulic reaction or error forces in the valve. In this manner, the amount of energy (current in the example of a solenoid operated valve) required to move the spool from its quiescent condition to a full flow condition is reduced. Of course, this reduction in required energy is also true if the valve is purely mechanical, i.e. a spool operator is engaged by a human hand to effect axial movement of the spool to move the spool to its open position. Moreover, as the example(s) illustrated in the specification shall show, multiple ports for multiple flow direction control may be easily altered by additional bleed like orifices which open before the main valve ports allow fluid communication therebetween. Additionally, centering grooves in either or both the spool and cage may also act as passages for not only centering but also for feeding fluid to the bleed orifices.

The technique above outlined distributes some of the forces effected by fluid flow onto the geometry of the cage and/or the geometry on the spool away from the metering edge(s) found on the conventional valve, thereby lessening wear on the metering edge(s). In effect, the extreme pressure differential across the metering edge is lessened by providing a series of parallel series flow paths that either open first or close last.

Other objects and a more complete understanding of the present invention may be had by referring to the following specification taken in conjunction with the accompanying drawings in which:

BRIEF DESCRIPTION OF THE DRAWINGS

FIG. 3C is a schematic and/or diagrammatic representation of the valve illustrated in FIG. 3A;

FIG. 3D is an exploded isometric view showing the cage separated from the spool of the valve of FIG. 3A;

FIG. 3E is an exploded, sectional isometric view, taken along line 3E-3E of the spool and cage of FIG. 3D;

FIGS. 3F0-3F3 are Orifice diagrams schematically illustrating fluid flows and areas relating to spool stroke and force diagrams of FIGS. 2 and 3B;

FIG. 4C is a schematic and/or diagrammatic representation of the valve illustrated in FIGS. 4A & 4B;

FIG. 4D is an exploded isometric view showing the cage separated from the spool of the valve of FIG. 4A;

FIG. 4E is an exploded, sectional isometric, taken along line 4E-4E of the spool and cage of FIG. 4D;

FIG. 5C is a schematic and/or diagrammatic representation of the valve illustrated in FIGS. 5A and 5B;

FIG. 5D is an exploded isometric view showing the cage separated from the spool of the valve of FIG. 5A;

FIG. 5E is an exploded, sectional isometric view taken along line 5E-5E of the spool and cage of FIG. 5D;

FIG. 6B is an exploded view of the spool and cage of FIG. 6A;

FIG. 6C is a schematic and/or diagrammatic representation of the valve illustrated in FIGS. 6A & 6B;

FIG. 7B is an exploded view of the cage and spool of FIG. 7A;

FIG. 7C is a schematic and or diagrammatic representation of the valve illustrated in FIGS. 7A & 7B;

FIG. 7D is an exploded, sectional isometric taken along line 7D-7D of the spool and cage of FIG. 7B;

FIG. 8B is an exploded isometric view illustrating the cage and spool of FIG. 8A;

FIG. 8D is a schematic and/or diagrammatic representation of the valve illustrated in FIGS. 8A-8C;

FIG. 8E is an exploded, sectional isometric taken along line 8E-8E of the spool and cage of FIG. 8B;

FIG. 9B is an exploded view of portions of the valve shown in FIG. 9A with the spool and sleeve separated to facilitate the view of the same;

FIG. 9C is a schematic or diagrammatic representation of the valve illustrated in FIGS. 9A & 9B and;

FIG. 9D is an exploded, sectional isometric, taken along line 9D-9D of the spool and cage of FIG. 9B.

DETAILED DESCRIPTION OF THE PREFERRED EMBODIMENTS

Figure 1A:
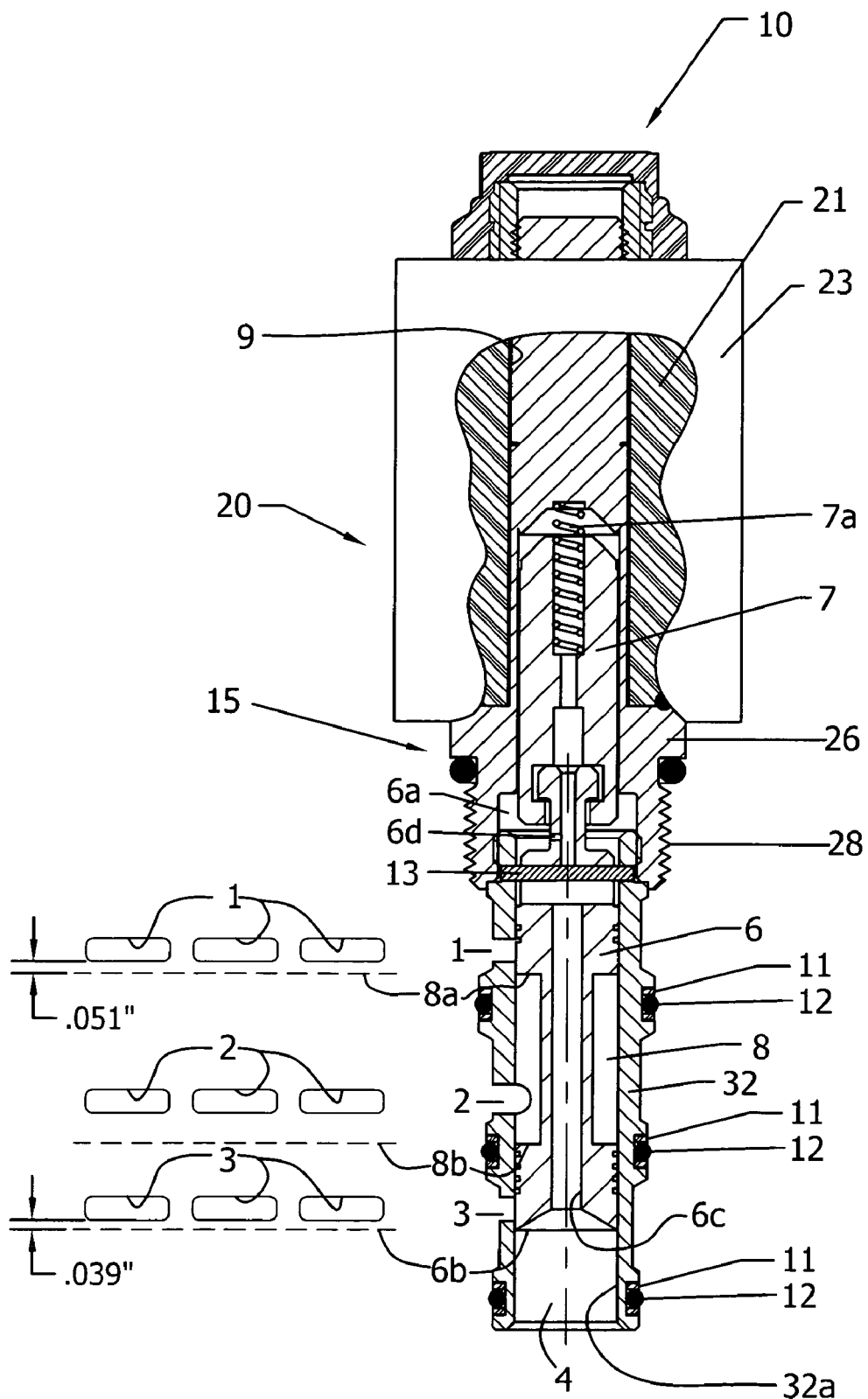
FIG. 1A (prior art) is a fragmentary side elevation of a solenoid operated, four way, two position, spool valve in a de-energized position and illustrating the ports in the valve sleeve and relative positions of certain edges on the spool relative to edges on the ports as if the sleeve were rolled out flat to view the relative positions.

While the present invention is susceptible of being made in any of several different forms, the drawings show just a few of particularly preferred forms and variations of the invention. One should understand, however, that these are just a few of many ways the invention can be made. Nor should any particular feature of the illustrated embodiment be considered a part of the invention, unless that feature is explicitly mentioned in the claims. In the drawings, like reference numerals refer to like parts throughout the several views.

Turning now to the drawings, FIG. 1A illustrates a typical, prior art, solenoid operated cartridge valve 10, (in fact, the depicted valve 10 is a Delta Power Company of Rockford Ill. model DG-S4B) comprising a coil-actuator assembly 20 which includes a coil 21 and a cartridge 15, the cartridge being dimensioned for insertion within a bore 9 coaxial with the axis of the coil. As is conventional, the valve 10 is adapted to be inserted and secured into a valve hydraulic manifold, housing, enclosure etc. (not shown). The valve is operated by applying a source of electrical power to the coil 21 as by external leads (Not shown). As described in co-pending application Ser. No. 11/351,590, filed on Feb. 10, 2006 and entitled "Harsh Environment Coil-Actuator for Cartridge Type Valve", the pertinent parts of which are herby incorporated by reference, as shown in FIG. 1, a cover 23 is supplied to shield the coil and bobbin. The cover 23 is a moulded thermoplastic, which while being relatively environmentally stable under harsh operating and external environmental conditions, also acts as an insulator and an external, easily bonded shell for constraining flux in the flux carrying path elements of the frame (not shown) interiorly of the coil-actuator 20.

As shown in FIG. 1A, the coil-actuated cover 23 is connected, to a nut shaped retainer 26, which forms part of the cartridge 15 and which is externally threaded as at the threads 28 for coupling to the aforementioned manifold, valve housing, enclosure etc. (not shown). It should be recognized that similar products may be retained by any convenient means, for example slip in products or valve parts which are held in place by screws or clips. The cartridge 15 is adapted to receive therein a casing, in the illustrated instance a cage or sleeve 32. This structure allows reciprocation within the cage 32 of a moveable device, in the present instance a tubular spool 6 connected by a slot forming a coupling in a solenoid armature 7 under control of the coil 21. The spool 6, actuated by the energization of the coil 21, operates for covering and uncovering rows of flow ports 1-3 in the wall of the cage and adapted for communication with a single central port 4. The ports of each of the rows 1-3 are shown laid out adjacent the valve, (as if the cage were unrolled) and the ports of each row are spaced equidistance apart about the circumference of the cage in a plane perpendicular to the axis of the valve. In the illustrated instance, the ports are in the form of circumferentially extending slots, An armature/spool return spring 7a normally biases the armature 7 and thus the connected spool 6 to, in the present instance, the normally closed (or de-energized) position as shown in FIG. 1A. As will be discussed hereinafter, many other spool/cage combinations are available, for example: 2 position, normally open; 2 position directional controls with 2, 3, 4 or more ports being disconnected or connected in combination.

In order to facilitate fluid communication between the various ports in the example valve shown in FIG. 1A, the spool 6 includes an axially and circumferentially extending recessed portion or recess 8 having a longitudinal or axial extent slightly greater than the axial distance between at least two of the rows of ports 1-2, 2-3. As shown best in FIG. 1A, the upper terminal end or edge 8a of the recessed portion 8, when the spool is in the de-energized position, is slightly below (0.051 inches) the lower edge of the slots in row 1. By the same token, the lower terminal edge 8b of the recess 8 is below the slot row 2. Also as illustrated in FIG. 1A, the lower operative terminal end 6b of the spool, which is in sealing relation to the interior bore 32a of the cage or sleeve 32 is slightly below the lower edge of the slots in slot row 3 (0.039 inches.) Also as shown in FIG. 1A, the spool 6 has a central bore 6c which allows fluid pressure present at port 4 to be also present at the upper end 6a of the spool 6 via aperture 6d (see FIG. 1B) so as to balance the hydraulic forces at opposite ends of the spool. In the de-energized position of the valve shown in FIG. 1A, note that the rows of slots are blocked from communication with each other and with the port 4.

Figure 1C:
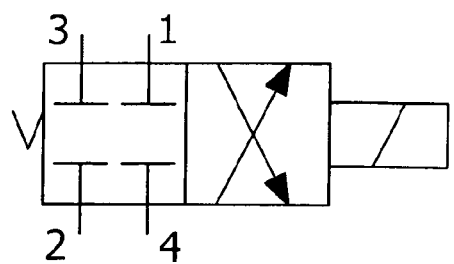
FIG. 1C is a schematic and/or diagrammatic representation of the valve illustrated in FIG. 1A.
Figure 1B:
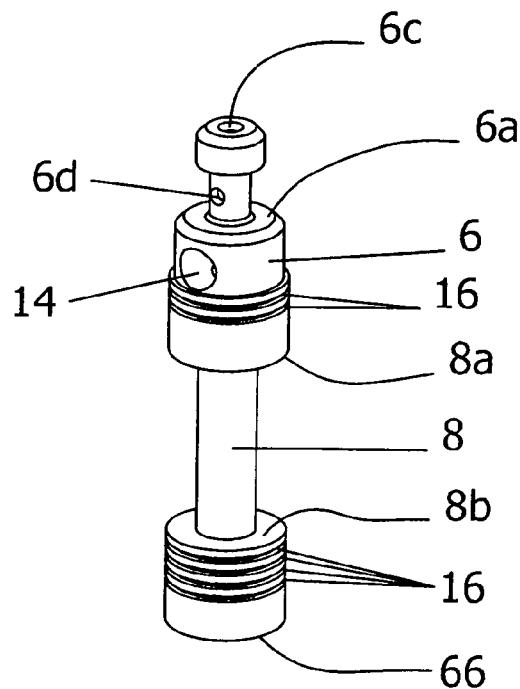
FIG. 1B is an exploded isometric view of the valve shown in FIG. 1A illustrating the spool and cage.
Figure 1B:
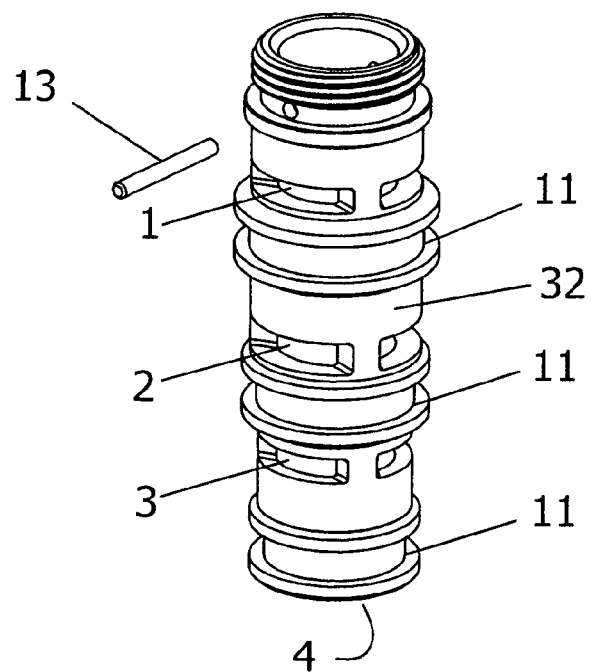

As illustrated best in FIGS. 1A and 1B, the cage or sleeve 32 contains a plurality of external grooves or recesses 11 in which are fitted O-rings 12 for providing a sealing engagement interiorly of the manifold and to isolate the ports from one another. In FIG. 1B, the O-rings 12 have been removed to better illustrate the formation of the recesses or grooves 11 associated with the sleeve or cage 32. As shown, the spool 6 is loosely coupled to the sleeve as by a pin 13 through the walls of the cage 32 and through an oversized slot, hole or aperture 14 in the spool 6. In this manner, the travel or reciprocation of the spool 6 is limited to the axial or vertical extent of the aperture 14. Moreover, as best illustrated in FIG. 1B, and as shown schematically in FIG. 1A, spool 6 is provided with static spool balancing or centering grooves 16 above and below the recess or groove 8 in the spool 6.

FIG. 1C is a schematic or diagrammatic representation of the valve illustrated in FIG. 1A and illustrates the fluid flow between ports 1 and 2, 3 and 4, and the fluid flow direction is as represented by the arrows. This schematic depiction of the valve 10 is normally designated as a 4W2P (four way, two position) spool valve.

Figure 2:
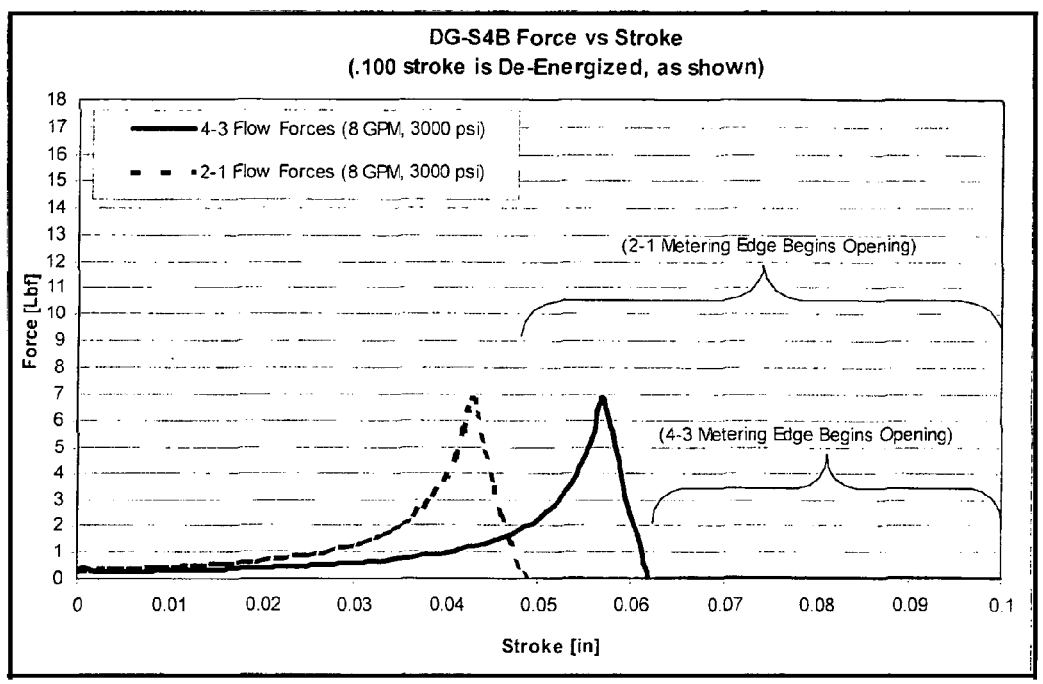
FIG. 2 is a spool stroke versus force diagram for the valve illustrated in FIG. 1A.

The rationale for modification of the valve of FIG. 1 is best illustrated in the force versus stroke diagram of FIG. 2. As noted in FIG. 2, the stroke of the spool is measured in thousands of an inch while flow force is represented in pounds on the ordinate of the diagram or chart. Also as shown, the entire stroke of the spool 6 is only 0.100 inches from the de-energized position to the fully energized position. As also may be envisioned by an examination of FIG. 1A, as the spool 6 is energized it moves from the position illustrated in FIG. 1A, upwardly, compressing the spring 7a due to the attraction of the coil 21 being energized thus causing the Armature 7 to move upwardly in the coil.

The zero position of the chart or diagram is when the spring 7a is fully compressed and port 1 is connected to port 2 through the recess or groove 8 in the spool 6, and port 3 is connected to port 4. Alternatively, when the spool 6 is in the position shown in FIG. 1A, i.e. de-energized, the spool is at the 0.100" or right end of the diagram. Thus the stroke of the spool is only 0.100". As the spool 6 is moved upwardly a sufficient distance port 3 is uncovered allowing fluid communication between the central port 4 and port 3. Referring now to FIG. 2, and that the spool 6 is in the de-energized position illustrated in FIG. 1A, as the solenoid or coil 21 is energized and the armature 7 commences an upward movement of the spool 6, compressing the spring 7a, and assuming that there is fluid pressure at port 4, no flow exists between ports 4 and ports 3 until the spool has traveled 0.039 inches at which time pressure of fluid starts flow between port 4 at port 3. Inasmuch as the pressure at the bottom 6b of the spool 6 is communicated to the top 6a of the spool 6 via bore 6c, the spool is initially in balance and the only energy required to effect upward movement of the spool 6 is the energy applied in the form of current to the coil 21. As fluid communication between port 4 and ports 3 commences, a differential pressure is created across the threshold between ports 4 and ports 3, requiring, because of an instantaneous increase in differential pressure between the top 6a of the spool 6 and the bottom 6b of the spool a flow force tending to work against the armature pull raising the spool 6. This increase requires more current in order to continue upward movement of the spool 6. Maximum flow and force in pounds, for the ports 4 to ports 3 flow is shown at the peak on the solid line flow forces and as pressure once more achieves a balance between the top 6a and the bottom 6b of the spool 6 the force required to continue upward movement of the spool 6 is lowered. Thus the flow induced forces, Bernoulli forces, or hydraulic reaction forces (error force) creates the necessity for a rapid increase in current through the coil to effect continued movement of the spool 6 against the spring 7a.

At this point it would be well to note if the design of the solenoid does not permit of sufficient current flow to permit overcoming of the error force, the spool 6 will tend to oscillate as the pressure differential between the top and bottom of the spool 6 oscillates in an attempt to equalize the pressure. As the spool 6 continues its upward movement, an additional upward movement of 0.012 inches more (0.051"-0.039") will allow fluid communication to start or commence between the recess or groove 8 (upper end or edge 8*a* of the groove 8) commences flow between ports 1 and 2. By way of example, assuming the pressure at port 2 is higher than that at port 1, the pressure drop across the lower edge of ports 1 creates a pressure differential identical with that of the fluid flow between ports 4 and 3. This is exhibited in the dashed lines in FIG. 2. Once again, the pressure differential acts as an error force (flow induced force, Bernoulli force, or hydraulic reaction force) which acts against the upward movement of they spool 6. The effect is that more current is required to maintain the upward movement of the spool 6, requiring larger solenoid coils and greater armature sizes.

Figure 3A:
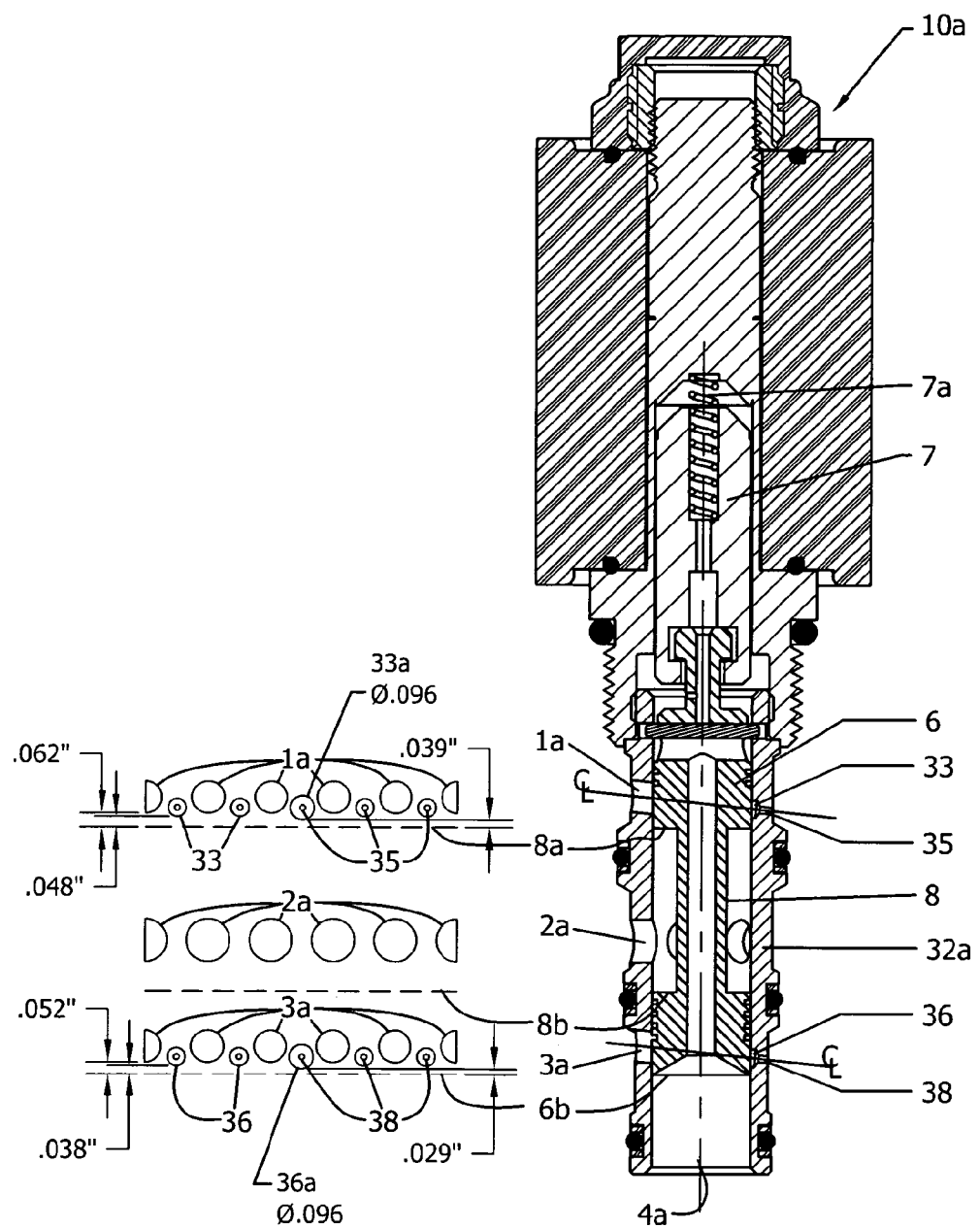
FIG. 3A is a fragmentary side elevational view of the valve shown in FIG. 1A in the de-energized position, but modified in accordance with the present invention and illustrating the ports in the sleeve and relative positions of certain edges on the spool relative to edges on the ports as if the sleeve were rolled out flat.

In accordance with the invention, and referring first to FIGS. 3A and 3D, the identical valve illustrated in FIGS. 1A &1B having identical numeral part identification, is illustrated therein, with the addition of incremental pressure drop passages to reduce the error force due to the pressure drop differential across the ports. To this end, as best illustrated in FIGS. 3A, 3D and 3E, the slot like ports 1-3 have been replaced with circular holes or bore like ports 1*a*-3*a* shown in the rolled out port or hole pattern to the left side of valve 10*a*. As will be seen from the following discussion, in the modified view example of FIG. 3A, the use of circular holes or bore like ports as opposed to slots facilitates manufacture or fabrication of the modified valve 10*a*.

As illustrated in FIGS. 3A, 3B, 3D & 3E, the incremental pressure drop passages which reduce the error force due to the pressure drop across the ports, comprises a plurality of recesses 33 interdigitated with the holes 1*a* of the ports and equally spaced about the circumference of the cage or sleeve 32*a* of the valve 10*a*, but lying in a plane slightly below the plane of the holes of the port 1*a*. A single, slightly enlarged recess 33*a* is also provided, with the same circumferential spacing as the recesses 33 and substituted for one of them. This configuration allows for a more gradual occurrence of flow forces.

Associated with the recesses 33 and 33*a* are fluid discharge ways, in the illustrated instance bleed orifices, apertures or holes 35 through the cage or sleeve 32*a* to allow fluid communication from the recess or groove 8 in the spool 6 to commence before the upper edge 8*a* (metering edge) of the groove 8 in the spool 6 starts to uncover the hole like ports 1*a* in the cage 32*a*. At the de-energized position of the valve, illustrated in FIG. 3A, the upper edge 8*a* of the recess or groove 8 in the spool is 0.062 inches from the lower edge of the holes 1*a*. In addition, the distance from the upper edge 8*a* to the recess 33 is illustrated as being 0.048 inches, while the distance from the upper edge 8*a* to the recess 33*a* is 0.039 inches. (It should be recognized that the dimensions of the valve spool and stroke given herein is only by way of example and the invention is not limited as to the particular dimensions given.) This means that the distance the spool 6 must travel upon energization from where fluid communication from the groove 8 of the spool 6 starts entry into the recesses 33*a* is 0.039 inches while the additional distance that the valve spool 6 must travel where fluid commences entry into the recesses 33 is 0.009 inches (0.048-0.039 inches). In this manner a gradual fluid flow discharge occurs over a very short distance before fluid flow commences through hole ports 1*a* directly from the spool 6 groove 8. The distance that the spool must travel before the edge 8*a* intercepts the holes 1*a* is only 0.014 inches (i.e. 0.062 inches-0.048 inches). Thus the bleed holes 35 in the base of the recesses 33 and the single recess 33*a*, form incremental pressure drop passages, permitting a gradual pressure differential reduction as the spool moves towards its fully energized position. This will become more evident upon the later discussion below relative to FIG. 3B.

In a like manner, the means to reduce the error force due to the pressure drop across the ports 4*a* to 3*a*, comprises incremental pressure drop passages which includes another plurality or series of recesses 36 interdigitated and equally spaced apart with the holes or ports 3*a*. A single, slightly enlarged recess 36*a* is also provided, with the same circumferential spacing as the recesses 36 and substituted for one of them. The base of the recesses 36 and the recess 36*a* incorporate fluid discharge ways, in the present instance bleed holes 38 through the cage or sleeve 32*a* to once again allow fluid communication from port 4*a* to ports 3*a* before the lower edge 6*b* of the spool 6 starts to uncover the holes 3*a* in the cage 32*a*. At the de-energized position of the valve, illustrated in FIG. 3A, the lower edge 6*b* of the spool is 0.052 inches from the lower edge of the holes 3*a*, (i.e. where fluid communication would normally start between port 4*a* and port 3*a*.) In addition, the distance from the lower edge of the spool 6*b* to the bottom of the dish like cup recess 36*a* is only 0.029 inches while it is 0.038 inches to the bottom of the other recesses 36. This means that the distance the spool 6 must travel upon valve energization from where fluid communication from the port 4*a* into the recesses 36*a* is 0.029 inches, and then 0.009 inches more (0.038-0.029 inches) to effect initial registration with the recesses 36 while the additional distance that the valve spool 6 must travel before fluid commences entry into the ports 3*a* is 0.014 inches (i.e. 0.052-0.038 inches).

Figure 3B:
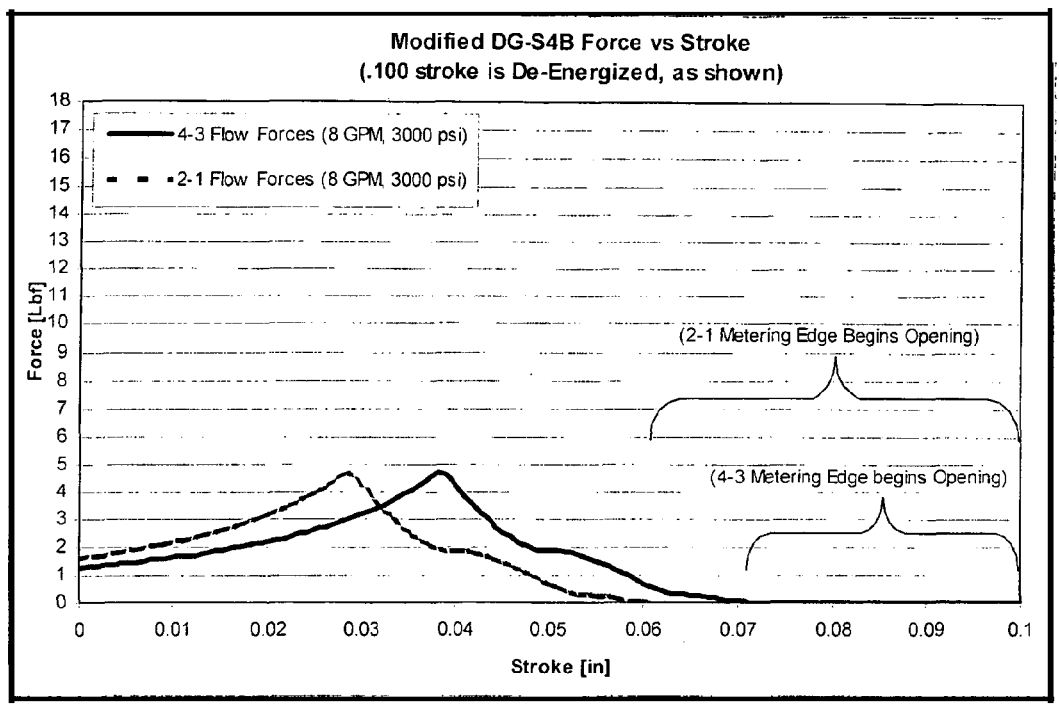
FIG. 3B is a stroke versus force diagram of the valve illustrated in FIG. 3A.

The difference that the recesses 33, 33*a*, and 36, 36*a* makes with their associated bleed holes 35, 38 in lowering the error force is evident when comparing the force vs. stroke diagrams of FIGS. 3B and 2. As shown in FIG. 3B, starting at the right where the spool is fully de-energized, as the spool 6 moves upwardly upon energization, the lower edge 6*b* of the spool (after a movement of 0.029 inches) intercepts the recesses 36*a* and fluid commences flowing into that recess, another 0.009 inches and then through the recesses 36 and in each instance then through the bleed apertures 38. Because fluid flow is gradual, notice that the sharp spike of full flow does not occur in the flow conditions of flow from port 4*a* to port 3*a*, as was the case in the unmodified valve of FIG. 1A and depicted in the diagram of FIG. 2. The same is also true for the graphic representation of the flow between port 2*a* and 1*a*. This observation translates into lower energy required to energize the spool from the rest or de-energized position to the fully energized position when the ports 2*a*-1*a* are in full fluid communication as are the ports 4*a*-3*a*. This means that the coils for particular valves may be more efficiently designed as less current is required to achieve the desired result. Moreover, as the pressure drop differential between the port is more gradual, less wear occurs on the metering edges.

The valve 10*a* illustrated in FIG. 3A may also be more easily manufactured by the use of drill holes for the ports 1*a*-3*a*. An examination of the center lines of the ports 1*a* and 3*a* show that they are drilled at an angle. The reason for this is that in manufacturing the recesses 33, 33*a*, and 36, 36*a*, a drill may be used to form the ports. By extending the drill at the angle of the ports and through the ports 1*a* and 3*a* to the opposite wall of the sleeve 32, the recesses may be formed by the cone shaped tip of the drill. Moreover, insertion of a smaller bit through the ports 1*a* and 3*a* facilitates the formation of the bleed holes 35 and 38 in the opposite sides (180° centrally of the recesses 33, 36. In this manner, as the spool 6 moves from the de-energized position to the fully open position, the pressure drop of the fluid through the ports is serially incremented resulting in a lower error force application against the direction of spool travel.

At point in the discussion it should be recognized that the recesses may take a number of shapes, e.g. cup or basin like, slot like (vertical or horizontal), key hole shaped, dished out or concave or any shape that is easy to manufacture. However the preferred shape of the recesses is cup or basin like. The major reason for the "cup like" descriptive preference is to allow for the function of receiving and/or holding or providing a passage for a liquid and as will also be shown, for ease of manufacture. Thus cup like is meant to cover variations in shape, such as mentioned above. Moreover, as shall become evident from the following discussion, the recesses 33, 36 may have a smaller or larger diameter than the holes comprising ports 1a, 3a it only being essential that the metering edges 8a, 6b intercept, as the valve is in transition from de-energized position to energized position, the recesses 33a, 33, 36a, 36.

It is convenient, at this point in the discussion, to make an observation. The word "operative" when used in conjunction with the terminal end of the moveable device or spool, e.g. "operative terminal end" refers to the portion of the moveable device against which fluid pressure is applied, in the instance of FIGS. 1A, 1B, 3A, 3D and 3E, the terminal end 6b of the spool. If, for example, the port 4a (FIG. 3A) was blocked, or if no pressure or low pressure (different than the pressure applied to port 2a) was applied to port 4a, but fluid pressure was applied to port 2a, the "operative terminal end" of the spool would be the metering edges or ends 8a and 8b of the recess or groove 8.

A computation example of the invention will be shown by calculation of the flow forces plotted in FIG. 2 and FIG. 3B. Recall, the valve in FIG. 2 (i.e. shown in FIGS. 1A and 1B) uses typical metering: where the opening and/or closing edges operate across a full (computationally speaking) pressure differential. The valve in FIG. 3B uses the metering noted in this invention. The metering edges manipulate the flow to create a series of parallel passages, reducing the force. There are three caveats for the reader: (1) Static Bernoulli forces are included in the following analysis, transient Bernoulli forces are not as they were deemed unnecessary to convey the key points of the invention; (2) some empirical values were assumed for simplification for the purpose of describing the invention. (The empirical value of 0.43 for the Bernoulli force equation, and 27 for the orifice equation,) and; (3) the empirical values estimate conservatively high forces in unlikely conditions of laminar flow as they were created to compare forces in more severe and typical condition of turbulent flow.

There are four items discussed in the following paragraphs labeled as parts: (1) Statement of flow force across a metering edge as described by Merritt in his treatise; (*Hydraulic Control Systems*", Herbert E. Merritt, John Wiley & Sons, 1967), pages 101-104, flow forces and pages 40-42 the orifice equation; (2) General operation parameters of a metering edge (max differential and max flow); (3) Static flow force calculation (FIG. 2) of the valve shown in FIG. 1A as a function of x, where x is the distance the metering edge is open, and; (4) Static flow force calculation (FIG. 3B) of the valve shown in FIGS. 3A, 3D & 3E as a function of x, where x is the distance the metering edge is open.

Part 1 (Statement of Flow Force Across a Metering Edge as Described by Merritt in his Treatise.)

Merritt defines flow forces across a metering edge as $$\text{Force} = 2 \cdot C_d \cdot C_v \cdot A_0 \cdot (P_{in} - P_{out}) \cdot \cos \theta$$

Where "Force" is the resultant force (in Lbf.) acting to close the metering edge. $C_d$ and $C_v$ (dimensionless) are the orifice coefficients. $A_0$ is the area (in$^2$) across the metering edge. $P_{in}$ is the inlet pressure (psi) of the control volume. $P_{out}$ is the outlet pressure (psi) of the control volume, and θ is the fluid jet angle (in degrees) at the metering edge (leaving the control volume).

Merritt indicates using:

$C_d = 0.61$ $C_v = 0.98$ $\cos \theta = 0.358$

Leaving the result, after substitution $$\text{Force}_{q1} = 0.43 \cdot A_0 (p_{in} - p_{out})$$

It is important to note, as Merritt describes, that this force acts to close the metering edge. Having said that, it may be beneficial to interpret this force as the reaction of the fluid jet on the metering edge. That is, a pressure gradient will form across the metering edge. And this pressure gradient will create a force lower than the $P_{in}$ pressure across the same area on the opposed surface. The difference in these forces is the Force described in the equations.

Part 2 General Operation Parameters of a Metering Edge (Max Differential and Max Flow);

To use the flow reaction force formula several other constraints are required, they are: (1) An area vs. stroke function. This function defines the $A_0$ in the equation. An orifice diagram, particularly in the type of metering which the invention employs, is useful; (2) Maximum flow; and (3) Maximum Pressure differential, these latter two defining the envelope of operating conditions used to compute the highest force loading conditions. It will be seen in the following sections that it is necessary to understand each of these levels as constraints during different stages of the analysis.

The orifice equation ($Q = 27 \cdot A_{orifice} \cdot \sqrt{\Delta P}$) is used to calculate the amount of flow passing through the metering edge at a pressure differential or the pressure differential at a given flow.

To start, when the metering edge begins to open the orifice equation is used to calculate the amount of flow. And when a specified maximum flow is reached the orifice equation is used to calculate the pressure drop across the metering edge. So, from a static point of view, when the metering edge is initially opened the inlet pressure is kept constant. When the area is large enough (or the metering edge opens enough) there is a finite point where it will pass maximum flow at the maximum pressure. This position indicates the location of maximum flow forces. Then as the metering opens further the metering edge formulas are defined by the maximum flow value so the pressure will decrease as the metering edge opens.

Part 3 Static flow force calculation (FIG. 2) of the valve shown in FIG. 1A as function of x, where x is the distance the metering edge is open. (see FIG. 3F0).

Constraints:

$A_0 = .310 \cdot 3 \cdot x;\ [\text{in}^2]$ $Q_{max} = 8;\ [\text{GPM}]$ $\Delta P_{max} = P_{in} - P_{out} = 3000 - 0 = 3000;\ [\text{psi}]$ Calculations:

$$\Delta P = P_{max}; \quad 0 < A_0 < \frac{Q_{max}}{27 \cdot \sqrt{\Delta P_{max}}}$$

$$Q = 27 \cdot A_0 \cdot \sqrt{\Delta P_{max}}; \quad 0 < A_0 < \frac{Q_{max}}{27 \cdot \sqrt{\Delta P_{max}}}$$

$$\Delta P = \left(\frac{Q_{max}}{27 \cdot A_0}\right)^2; \quad A_0 > \frac{Q_{max}}{27 \cdot \sqrt{\Delta P_{max}}}$$

$$Q = Q_{max}; \quad A_0 > \frac{Q_{max}}{27 \cdot \sqrt{\Delta P_{max}}}$$

$$\text{Force} = .43 \cdot A_0 \cdot \Delta P$$

Note, this is the general calculation for the flow ports 1, 2, and 3 shown in FIGS. 1A and 1B. The area labeled $A_0$ is the approximate area of the three slot like ports.

In order to plot the forces shown on FIG. 2 the "x" value (FIG. 1A: 0.05.1 and 0.039) is offset by the amount indicated and multiplied by negative 1 (to mirror the computation and shift it to the proper origin). The functions are manipulated to the form: f(x)=f(0.051−x) or f(0.039−x).

Part 4 (Static Flow Force Calculation [FIG. 3b] of the Valve Shown in FIG. 3A Function of x)

The simple orifice diagrams illustrated in FIGS. 3F1-3F3 form the basis for the following discussion, utilizing the constraints discussed below.

This section explains the reduction between the Figures titled: "Orifice Diagram" (FIG. 3F1), "Reduced Orifice Diagram 1" (FIG. 3F2), and "Reduced Orifice Diagram 2" (FIG. 3F3). Essentially the reduction allows the overall orifice diagram to be reduced to a more manageable orifice diagram. The more manageable diagram is then used (as shown in Part 3) to calculate the total flow or pressure drop (one is given and the other calculated). The reduction shown should be considered an example, where more complex or straightforward application can be performed in a similar manner.

The two sets of series orifices of the "Orifice Diagram" (or FIG. 3F1), $A_2$ and $A_3$ for $Q_3$, and $A_4$ and $A_5$ for $Q_4$ are reduced to an equivalent area to create "Reduced Orifice Diagram 1" (or FIG. 3F2). The reduction of the series orifice areas takes the following form:

$$A_{Equiv:2-3} = A_2 \sqrt{\frac{A_3^2}{A_2^2 + A_3^2}};$$

where $A_{Equiv:2-3}$ is the area equivalent of two series orifices, $A_2$ is the area of the first orifice in the series, and $A_3$ is the area of the second orifice in the series.

The equation reduces the series orifices, $A_2$ and $A_3$, to the equivalent orifice $A_{Equiv:2-3}$ and also by substitution reduces the series orifices, $A_4$ and $A_5$, to the equivalent orifice $A_{Equiv:4-5}$. The results are "Reduced Orifice Diagram 1" (or FIG. 3F2). Next, the parallel orifices in the diagram "Reduced Orifice Diagram 1" (or FIG. 3F2) are reduced in a similar manner to create an equivalent area of the orifices $A_1$, $A_{Equiv:2-3}$, $A_{Equiv:4-5}$. Parallel orifices are combined by adding their collective areas, so:

$$A_{Equiv:1-(2-3)-(4-5)} = A_1 + A_{Equiv:2-3} + A_{Equiv:4-5};$$

Where $A_{Equiv:1-(2-3)-(4-5)}$ Is the area equivalent of the three parallel orifices.

$A_1$ is the area of the first parallel orifice, $A_2 = A_{Equiv:2-3}$ is the area of the second parallel orifice, and $A_3 = A_{Equiv:4-5}$ is the area of the third parallel orifice.

The equation yields the "Reduced Orifice Diagram 2" (or FIG. 3F3).

Constraints:

$$A_1 = 5 \cdot \left(2 \cdot \left(\frac{.140}{2}\right)^2 \cdot \tan^{-1}\left(\frac{\sqrt{x - .023}}{\sqrt{.140 - (x - .023)}}\right) - \sqrt{x - .023} \cdot \left(\frac{.140}{2} - (x - .023)\right) \cdot \sqrt{.140 - (x - .023)}\right)$$

For x>0.023. These are the ports or holes 1a (or 3a). 5 is the quantity, 0.023 is the distance to recesses 33 or 36 (i.e. 0.062−0.039 or 0.052−0.029"), and 0.140 is the diameter of the holes 1a and 3a. The equation calculates the area of the circular cord segment created by the edge 8a (or 6b) and the ports or holes 1a (or 3a). Units are in².

$$A_2 = 4 \cdot \left(2 \cdot \left(\frac{.078}{2}\right)^2 \cdot \tan^{-1}\left(\frac{\sqrt{x - .009}}{\sqrt{.078 - (x - .009)}}\right) - \sqrt{x - .009} \cdot \left(\frac{.078}{2} - (x - .009)\right) \cdot \sqrt{.078 - (x - .009)}\right)$$

For x>0.009. These are the recesses 33 or 36. 4 is the quantity, 0.009" which is the distance from the lower edge of recesses 33a or 36a to the lower edges respectively of recesses 33 or 36, (i.e. 0.048"−0.039 or 0.038−0.029"), and 0.078" is the diameter of the recesses 33, 36. The equation calculates the area of the circular cord segment created by the edge 8a (or 6b) and the recesses at 33a (or 36a). Units are in².

$$A_3 = 4 \cdot \left(.028^2 \cdot \frac{\pi}{4}\right)$$

These are the bleed holes 35 (or 38). 4 is the quantity and 0.028" is the diameter. Units are in².

$$A_4 = 1 \cdot \left(2 \cdot \left(\frac{.096}{2}\right)^2 \cdot \tan^{-1}\left(\frac{\sqrt{x}}{\sqrt{.096 - x}}\right) - \sqrt{x} \cdot \left(\frac{.096}{2} - x\right) \cdot \sqrt{.096 - x}\right)$$

For x>0. These are the bleed holes for the recesses 33a (or 36a). 1 is the quantity and 0.096" is the diameter. The equation calculates the area of the circular cord segment created by the edge 8a (or 6b) and the bleed holes at the recesses 33a (or 36a). Units are in².

$$A_5 = 1 \cdot \left(.028^2 \cdot \frac{\pi}{4}\right)$$

These are the bleed holes 35 (or 38). 1 is the quantity and 0.028 is the diameter. Units are in².

$$A_{Equiv:2-3} = A_2 \cdot \sqrt{\frac{A_3^2}{A_2^2 + A_3^2}}$$

$$A_{Equiv:4-5} = A_4 \cdot \sqrt{\frac{A_5^2}{A_4^2 + A_5^2}}$$

$$A_{Equiv:(1)-(2-3)-(4-5)} = A_1 + A_{Equiv:2-3} + A_{Equiv:4-5}$$

$$Q_{max} = 8[GPM]$$

$$\Delta P_{max} = P_{in\_max} - P_{out} = 3000 - 0 = 3000[psi]$$

Calculations:

$$P_{in} = \Delta P_{max}; \ 0 < A_{Equiv:(1)-(2-3)-(4-5)} < \frac{Q_{max}}{27 \cdot \sqrt{\Delta P_{max}}}$$

$$Q_1 = 27 \cdot A_{Equiv:(1)-(2-3)-(4-5)} \cdot \sqrt{\Delta P_{max}};$$

$$0 < A_{Equiv:(1)-(2-3)-(4-5)} < \frac{Q_{max}}{27 \cdot \sqrt{\Delta P_{max}}}$$

$$P_{in} = \left(\frac{Q_{max}}{27 \cdot A_{Equiv:(1)-(2-3)-(4-5)}}\right)^2;$$

$$A_{Equiv:(1)-(2-3)-(4-5)} > \frac{Q_{max}}{27 \cdot \sqrt{\Delta P_{max}}}$$

$$Q_1 = Q_{max}; A_{Equiv:(1)-(2-3)-(4-5)} > \frac{Q_{max}}{27 \cdot \sqrt{\Delta P_{max}}}$$

$$Q_3 = 27 \cdot A_{Equiv:2-3} \cdot \sqrt{P_{in}}$$

$$Q_4 = 27 \cdot A_{Equiv:4-5} \cdot \sqrt{P_{in}}$$

$$P_2 = P_{in} - \left(\frac{Q_3}{27 \cdot A_2}\right)^2$$

$$P_3 = P_{in} - \left(\frac{Q_4}{27 \cdot A_4}\right)^2$$

$$\text{Force} = .43[A_1 \cdot P_{in} + A_2 \cdot (P_{in} - P_2) + A_4 \cdot (P_{in} - P_3)];$$

The last equation sums the flow reaction forces at the metering edges along the static "x" positions. Similar to the previous example, to obtain the values plotted in FIG. 3B the "x" values are mirrored and offset by the amounts (0.029" and 0.039") shown in FIG. 3A.

The resulting flow reaction force calculations of the valve shown in FIG. 3A will be lower than conventional style metering used on the valve in FIG. 1A. After some substitution, the ratio reduction in force takes the following approximate form where a conventional designed products force is indicated in the denominator and a design utilizing the invention has a force indicated in the numerator:

$$\frac{.43[A_1 \cdot P_{in} + A_2 \cdot (P_{in} - P_2) + A_4 \cdot (P_{in} - P_3)]}{.43 \cdot A_0 \cdot P_{in}} =$$

$$\frac{Q_2}{Q_1} + \frac{Q_3 \cdot A_2 \cdot \sqrt{P_{in} - P_2}}{Q_1 \cdot A_{Equiv:2-3} \cdot \sqrt{P_{in}}} + \frac{Q_4 \cdot A_2 \cdot \sqrt{P_{in} - P_3}}{Q_1 \cdot A_{Equiv:4-5} \cdot \sqrt{P_{in}}}$$

The reduction is a direct result of the series of parallel passages.

At this juncture of our discussion of the present invention, it should be understood that the incremental pressure drop passages which include the recesses, may be situated in the spool as opposed to the cage or sleeve, and as well in both spool and cage. A typical construction of a kind of valve embodiment in which the recesses and associated bleed holes are located in the spool is illustrated in FIGS. 4A, 4B, 4D and 4E (a modified Delta Power Company model DE-S2G). To this end, a valve 50 includes a spool 56 which is mounted for reciprocation in a sleeve 62. The spool 56 is coupled to, as before, an armature 67 which in conjunction with a solenoid 68 operates to move the spool 56 between the de-energized position illustrated in FIG. 4A, and the energized position illustrated in FIG. 4B. In the instances of the figures comprising FIG. 4, however, the cage 62 contains a single series of ports 51 which are equally and circumferentially spaced apart around the cage and permit, when the spool is in the position illustrated in FIG. 4B, fluid to flow between port 54, to and through ports 55 in the wall of the spool 56 and through cage ports 51. To facilitate balancing of the spool in the radial direction, and to minimize frictional engagement against the interior wall of the cage 62, a plurality of centering recesses 57, having fluid discharge ways associated therewith, in the present instance centrally located bleed holes 58, are equally and circumferentially spaced apart around the spool 56. The recesses also provide for a flow passage when opened as described below. A circumferentially extended groove 52 may be formed in a plane perpendicular to the axis of the spool underlying the ports 51 in the interior of the cage for the purpose of a flow path and pressure balancing.

Figure 4A:
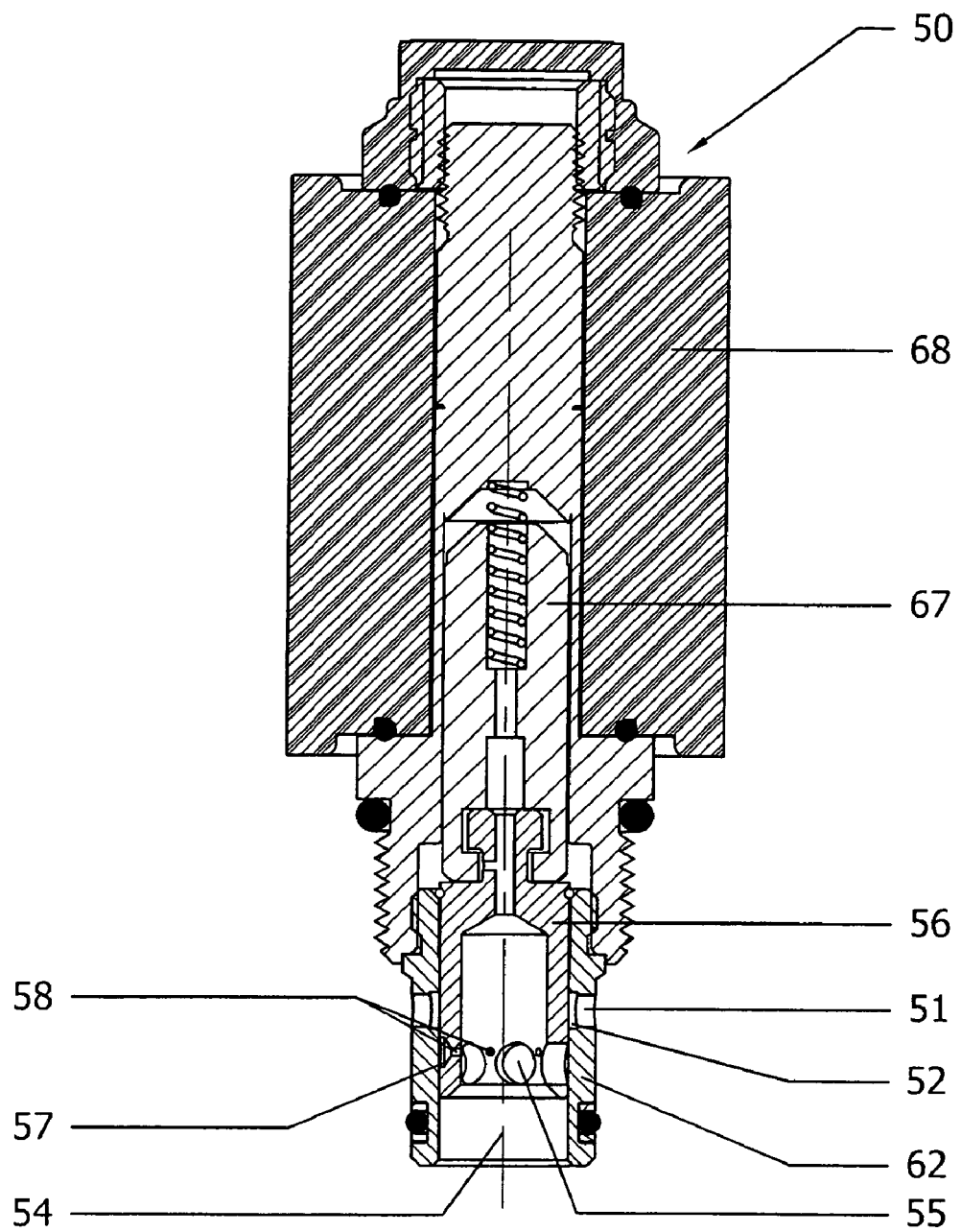
FIG. 4A is a fragmentary side elevation of another valve illustrating spool metering apparatus with the cage or sleeve having a conventional undercut, but the valve being constructed in accordance with the present invention and showing the valve in a de-energized position.
Figure 4B:
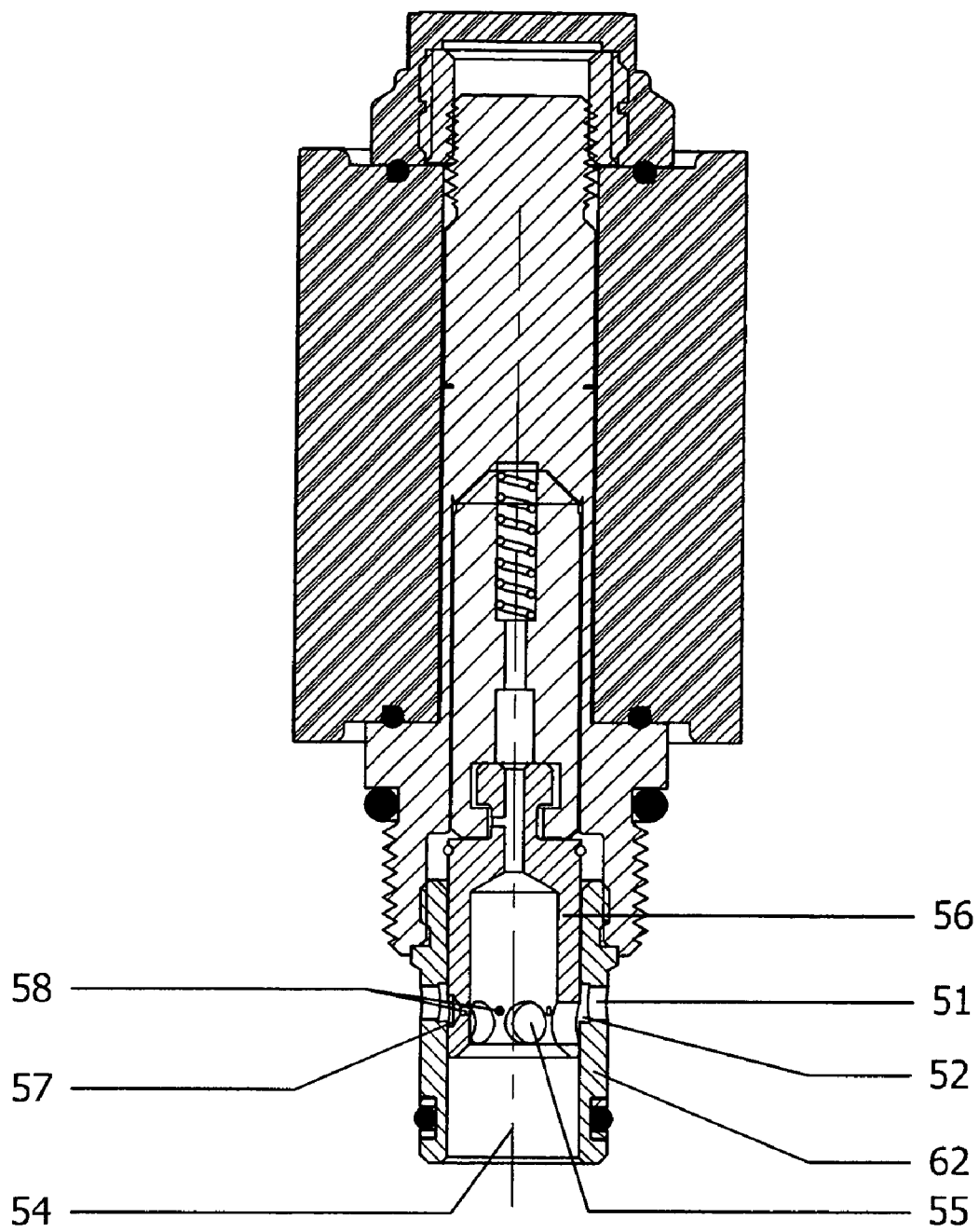
FIG. 4B is a fragmentary side elevational view of the valve of FIG. 4A but illustrating the valve in the energized position.

As the spool 56 moves from the de-energized position illustrated in FIG. 4A to the energized position shown in FIG. 4B, the recesses 57 in the exterior wall of the spool 56 and having centrally located bleed holes 58 therein, allow premature fluid communication between the fluid entry port 54 and through the holes or ports 55 into the ports 51. The fluid flows through the bleed holes 58 into the recesses 57, and since the diameter of the recesses 57 is larger than the diameter of the bleed holes, serial engagement of the recesses and the commencement of fluid entry into the ports 51 associated with the sleeve or cage 62 occurs prior to full mating of the ports 55 and the ports 51. Because of initial entry of the fluid through the bleed holes 58 and then the cup-like recesses 57 into the groove or channel 52 underlying the ports 51 in the cage 62, the error force is reduced and the charted graph of the error force of this valve 50 is similar to the port 4a-3a diagram in FIG. 3B.

Another benefit of the reduction in error force in the valve of, for example, FIG. 4, is the allowance of greater fluid flow, i.e. an increase in the operational limits in the fluid flow capacity of the valve. For example, in a three-way valve such as the Delta Power Company DF-S3B valve, under extreme conditions and selected test conditions operating limits have shown an improvement of approximately 80% in flow capacity (i.e. ~4.5 gpm versus 2.5 gpm). The benefits include a capability of handling an increased pressure drop for the equivalent stroke of the spool, or an increased stroke for equivalent pressure drop. The means by which this may be accomplished is discussed more fully in the following paragraphs.

Figure 5A:
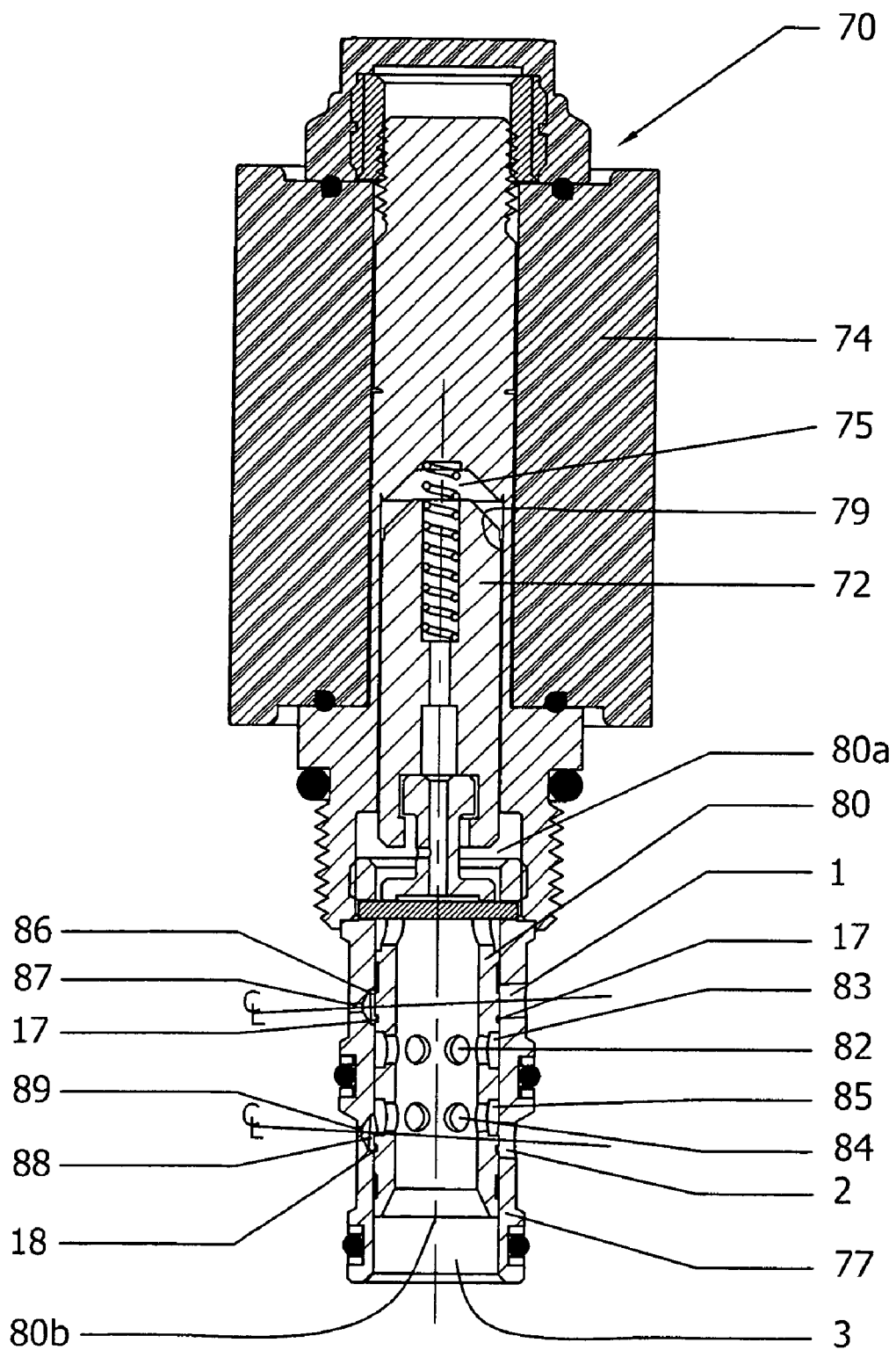
FIG. 5A is a fragmentary side elevational view of yet another valve constructed in accordance with the present invention and illustrating incremental pressure drop and fluid bleed functions for the energized and de-energized valve function.
Figure 5B:
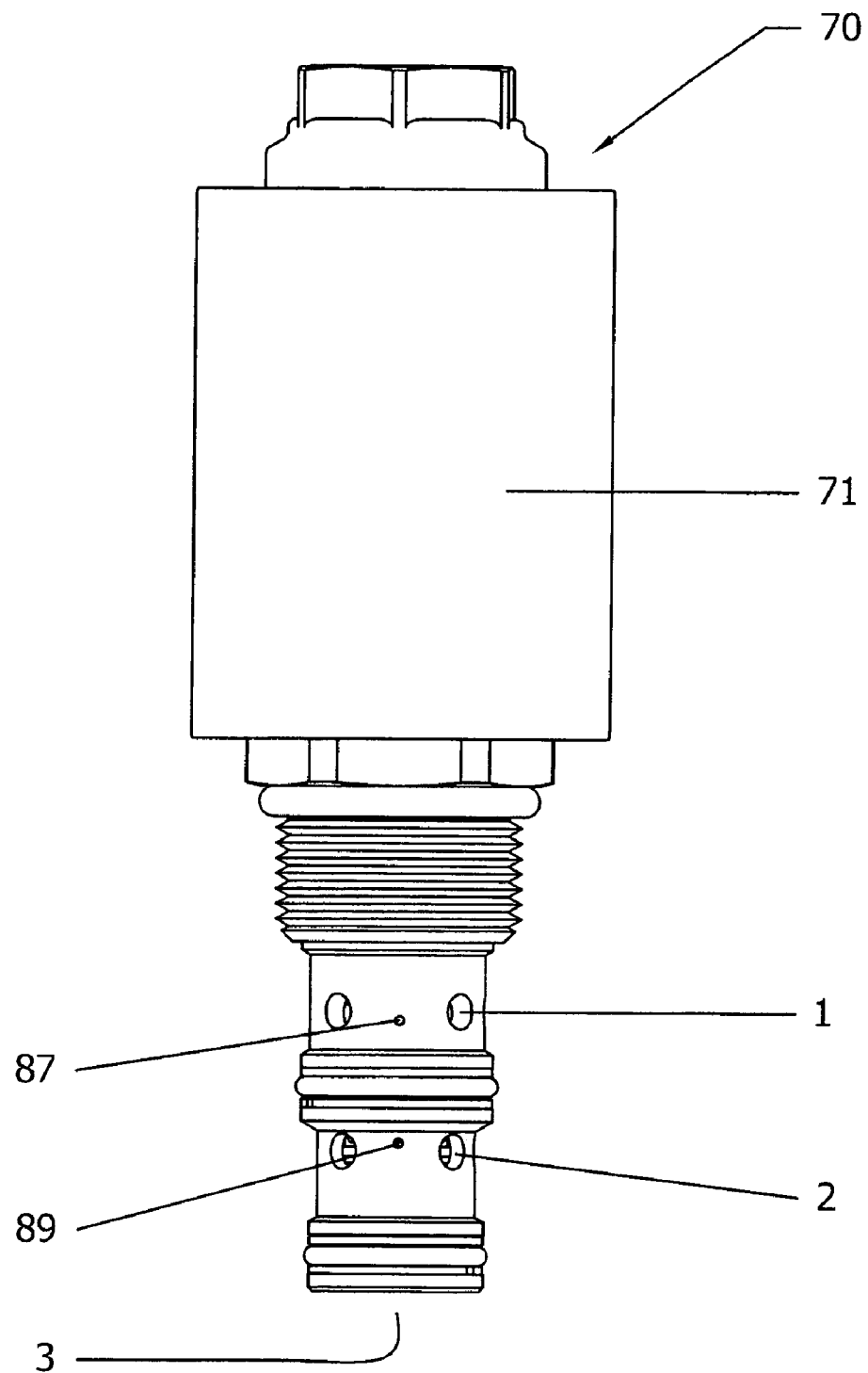
FIG. 5B is a side elevational view of the valve of FIG. 5A illustrating the sleeve, its ports, and metering bleed holes as well as the exterior view of the Valve including a sample cover.

Turning now to FIGS. 5A, 5B, 5D & 5E, a three-way two position (3W2P) spool valve 70 is illustrated therein. As shown, this is a modified Delta Power Company model DF-S3B valve schematically represented in FIG. 5C and includes incremental pressure drop passages constructed in accordance with the present invention. The valve 70 is solenoid operated including an armature 72 coupled as before to a valve spool 80, housed for reciprocation within a bore 79 within the solenoid coil 74. As before, a return spring 75 maintains the armature 72, in the de-energized position illustrated in FIG. 5A. As illustrated, the spool contains two rows of ports, an upper row 82 and a lower row 84 which permit fluid communication from the central port 3 into the ports in rows 82 and 84 of the spool 80. As shown best in FIG. 5D, the holes in both rows 82 and 84 in the spool walls include circumferentially extending exterior grooves 83 and 85 respectively. In the position shown in FIG. 5A, fluid communication is allowed between the central port 3 and the cage ports 2 when the valve 70 is in the de-energized position. (It should be recognized that the ports 1 and 2 in the wall of the cage 77 really comprise a plurality of angled holes or apertures equally spaced about the circumference of the cage.) Moreover as best illustrated in FIGS. 5B and 5D, similar to the layout of the ports in FIG. 3A, incremental pressure drop passages including recesses 86, 88 are interdigitated and formed in rows (upper and lower) with the holes of the ports 1, 2 respectively, in cage walls opposite the holes of the ports 1, 2 of the cage 77. As shown, each of the recesses 86 and 88 has associated therewith fluid discharge ways, in the present instance comprising a central bleed aperture 87, 89. Moreover, a circumferentially combinational extending balancing and fluid feeding groove 17, 18, in the exterior of the spool 80, intercepts the respective recesses 86, 88. As shown, these grooves 17, and 18 also act as incremental pressure drop passages. In addition, for reasons which shall be understood as explained hereinafter, note that the center lines passing through the respective ports 1 and 2, and intercepting respectively their associated opposite wall recesses 86, 88 are skewed, unlike the parallel center lines for the angled ports 1a & 3a associated with FIG. 3A.

It should also be noted that in the energized position, with fluid pressure at port 2, the recesses 88 are filled with fluid as are the groove 18, which in combination act as a hydrostatic or centering bearing for the spool. In the de-energized position, and with the fluid pressure at port 1, the recesses 86 and groove 17 also serve as spool centering devices and a hydrostatic bearing for the spool 80.

Upon energization of the coil 74 of the solenoid, the armature 72 starts moving the spool 80 upwardly. Depending upon the spacing between the upper and lower exterior grooves 83, 85 of the spool 80, and the spacing between the recesses 86, 88, fluid communication between central port 3 and ports 2 will continue until there is no overlap between lower groove 85 of the spool 80 and cage recess 88. As the grooved portion 83 of the ports 82 of the spool 80 moves upwardly, the grooved portion 83 will intercept the recesses 86, which in turn feeds fluid into groove 17 which then also serves as a fluid feed line to port 1 allowing fluid communication between recess 86 and port 1 via these groove passages and the bleed holes 87. Thus fluid flow enters cage port 1 via two types of passages. One type of passage is through bleed hole 87. The other type of passage are through the balancing flow grooves 17 which each communicate from each recess 86 to the closest angled hole of port 1. Because an intermediate pressure exists in each of the five recesses 86 and the ten grooves 17, additional centering force is generated in this critical metering region. This geometry permits a gradual pressure drop to occur at the functional metering edge while port 1 is opened and port 2 is closed.

As the energy or current is removed from the solenoid or coil 74, the return spring 75 tends to move the armature 72 and thus the spool 80 towards its de-energized or neutral position illustrated in FIG. 5A. As the spool 80 descends, the flow is gradually decreased from full between the port 82 and the port 1 because of the cuplike recesses 86, associated bleed holes 87 and groove 17 being located so that grooved portion 83 maintains intercept while fluid communication directly between grooved portion 83 and 1 have been closed. In a like manner, the ports 84 gain partial intercept because the cuplike recesses 88, associated bleed holes 89 and groove18 are located so that grooved portion 85 provides passage prior to creating a full connection between port 2 and 3, i.e. slightly before they intercept the holes of the ports 2, permitting a bleeding off of fluid flow from port 3 through the bleed holes 89 before communication fully occurs between ports 2 and 3. In this manner, by placing the recesses in the position shown, a smooth transition between no flow and full flow between the ports is obtained while reducing the error force which normally would impede transition of the spool 80 between its energized and de-energized position. Moreover, by arranging the cuplike recesses to effect transitioning of the spool between both the energized and de-energized positions, less current may be required for energization and lower spring return pressure may be utilized for armature and spool return to the de-energized position. (Another way of looking at this is that a reduction in error force increases the load carrying capacity of the valve, including allowing for increases in fluid flow capacity.)

FIG. 5B is side elevation view of the valve 70 with a cover 71 in place. This view in conjunction with FIGS. 5D and 5E illustrate a view of the valve showing the position of the bleed holes 87 and 89 with relation to the ports 1 and 2, and the grooves 83 and 85 associated with the ports 82 and 84 on the spool 80, as well as illustrating the position of the fluid balancing and fluid feed grooves 17 and 18.

Figure 6A:
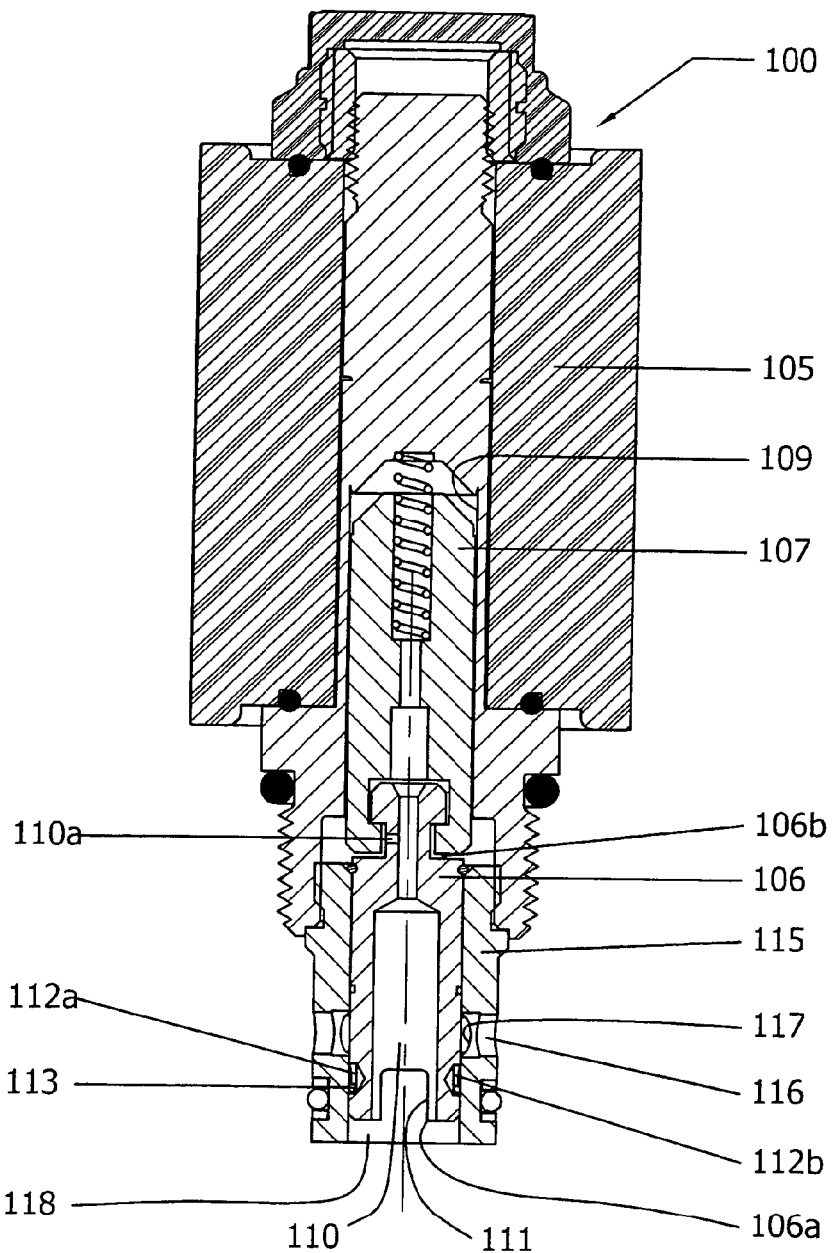
FIG. 6A is a side elevational view of still another valve embodying spool metering with a slotted spool constructed in accordance with the present invention and illustrating an undercut in the cage underlying the hole like ports.

FIG. 6A and FIG. 6B illustrate another modification of the Delta Power Company two way, two position normally closed valve DE-S2G. Referring now to FIGS. 6A and 6B, a solenoid actuated valve 100 is illustrated therein, the valve including a solenoid 105 which when current is applied to the coil of the solenoid attracts an armature 107 housed for reciprocation within the bore 109 of the solenoid. As before, the armature 107 is coupled to a valve spool 106 for reciprocation within a cage 115 having circumferentially and equally spaced ports, in the illustrated instance holes 116 therein including a groove or undercut portion 117 circumferentially undercutting the interior of the ports 116. The groove 117 serves to balance the spool 106 radially in the cage 116.

As is illustrated in FIG. 6A, a spool 106 has a hollow central portion or bore 110 which permits fluid communication with the upper end 106b of the spool 106 through an outlet bore 110a, the lower end 106a of the spool 106 including a slot 111 which extends through the walls of the spool, the lower end 106a with the cage 115 forming a primary valve port 118. On opposite exterior walls of the slot 111, and in the spool 106 are incremental pressure drop passages including blind recesses 112a, 112b with an underlying, undercut or groove 113 comprising fluid discharge ways. The groove 113 in conjunction with the slot 111 permits fluid entry from the primary port 118 into the recesses 112a, 112b, and simultaneously allows the recesses to act in conjunction with the groove 113 to center the spool in the cage 116.

In operation, as the spool 106 starts its upward movement due to energization of the solenoid 105, the fluid filled recesses 112a, 112b intersect the groove or undercut 117 underlying the port or holes 116 in the cage 115 before the slot 111 moves into a position allowing full fluid flow from the port 118 through the ports 116. In this manner, the groove 113, acting in conjunction with the slot 111 in the spool 106 serves as incremental pressure drop passages and fluid discharge ways insuring the same function as the bleed holes heretofore described in FIGS. 3-5, reducing the error force due to fluid flow and improving the operation of the valve 100 by reducing the energy required to move the spool 106 from the de-energized position to the energized position. In addition, the pressurized fluid filled recesses 12a, 112b and connected groove 113 serve to center the spool 106.

Figure 7A:
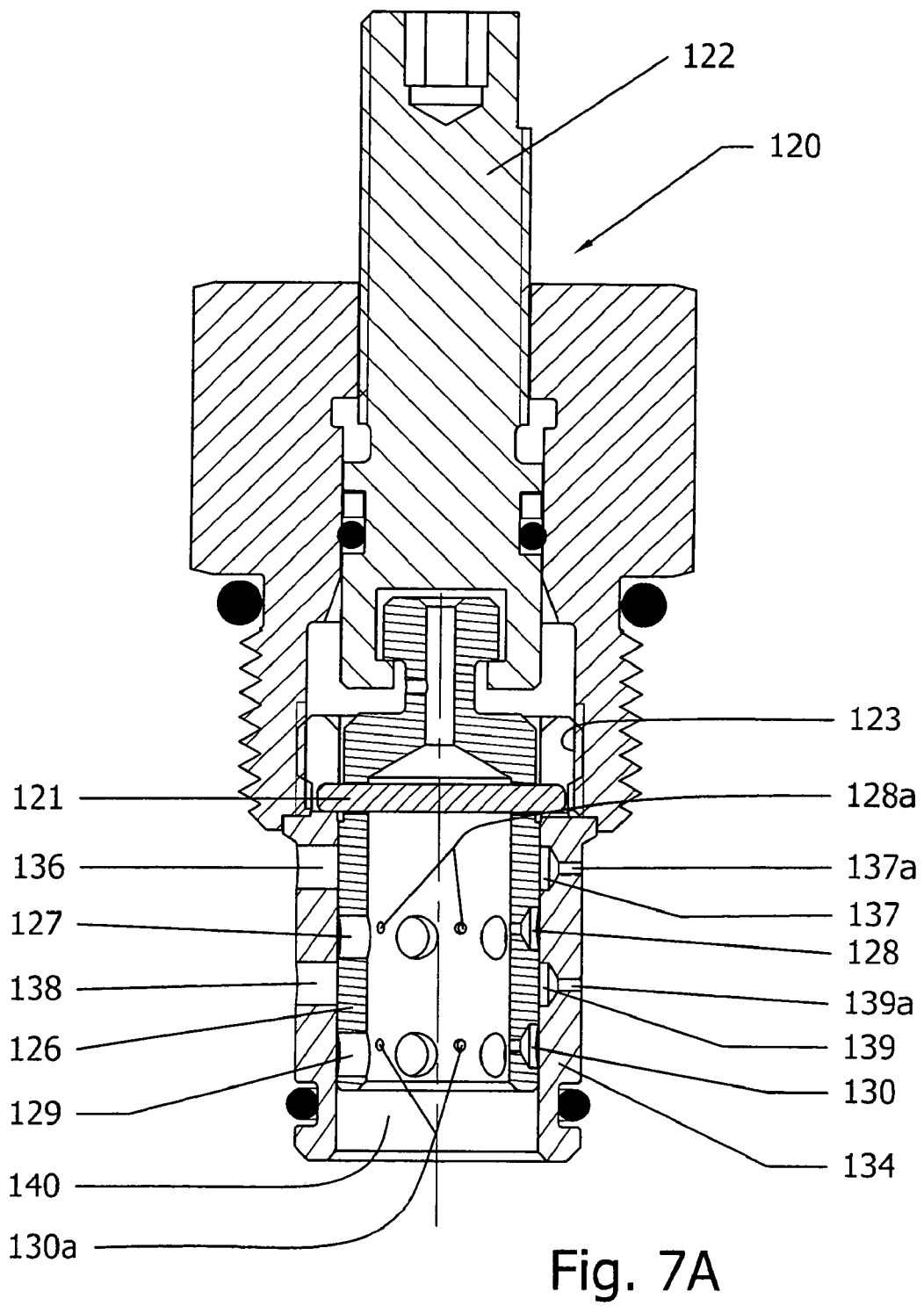
FIG. 7A is fragmentary side elevational view of a valve which is manually actuated and which shows a combination of spool and cage metering in which bleed holes and bleed elements are keyed to the spool and to the cage.

Turning now to FIG. 7A, a manually actuated valve 120, such as a modified Delta Power Company DE-M2G is illustrated therein. This valve 120 includes a handle or post 122 which is rotatably (as by threads) coupled to a spool 126 which in turn is keyed, as by a pin 121 in a slot 123 in a cage 134 to permit relative axial motion between the spool and cage, but not rotational movement of either. As shown, the cage has two rows of ports, 136 and 138. A central port 140 allows entry of fluid into the interior of the cage and spool 126 for fluid communication between the upper ports 127 and the cage upper ports 136 when the spool 126 is elevated into the position allowing such fluid flow (i.e. the ports 127 and 136 are in registry). In a like manner, the lower spool ports 129 when elevated into a position of registry with the lower cage ports 138 allows fluid communication between those ports. The valve 120 is shown in the first position where both cage ports 136 and 138 are fully closed, i.e. the maximum amount of movement permitted by the pin 121 in the slot 123.

As illustrated in FIGS. 7A, 7B and 7D, both the cage 134 and the spool 126 are provided with incremental pressure drop passages, in the illustrated instance recesses 128, 130 with fluid discharge ways comprising bleed orifices or passages 128a and 130a respectively, interdigitated between the rows of ports 127, 129 respectively, for communication with the interior of the spool 126. In a like manner, the cage 134 includes incremental pressure drop passages comprising recesses 137, 139 each recess also having fluid discharge ways including associated bleed holes 137a, 139a which are in fluid communication with the ports 136, 138 of the cage 134 and interdigitated with those respective ports. It should be noted that the recesses 137, 139, may be aligned in the same radial plane perpendicular to the axis of the valve 120 because the recesses 128 and 130 associated with the spool 126 are offset to permit engagement with the recesses 139 and 137 prior to full registration of the ports 127, 129 of the spool 126 with the ports 136, 138 of the cage 134.

In operation, as the post 122 is rotated to effect vertical movement of the spool 126 relative to the cage 134, the cuplike recess 130 starts to overlap the cuplike recess 139, and depending upon the spacing between the cuplike recess 128 of the spool 126 and the cuplike recess 137 of the cage 134, fluid communication commences from the port 140 into the recesses via the bleed holes or orifices and out the respective ports 136 and 138 of the cage 134. As further movement occurs, flow will increase until full registry of all the ports 127, 129 with respective ports 136 and 138 occurs. Thus pressure release is stepped or gradual as in a metering function reducing the error force which would normally be incurred without the incremental pressure drop passages of the recesses and their associated bleed holes. Moreover, it should be recognized that the recesses on both the cage and the spool (137, 139 and 128, 130 respectively) serve to trap fluid and serve an additional centering function when the valve is de-energized or fully open.

Figure 8A:
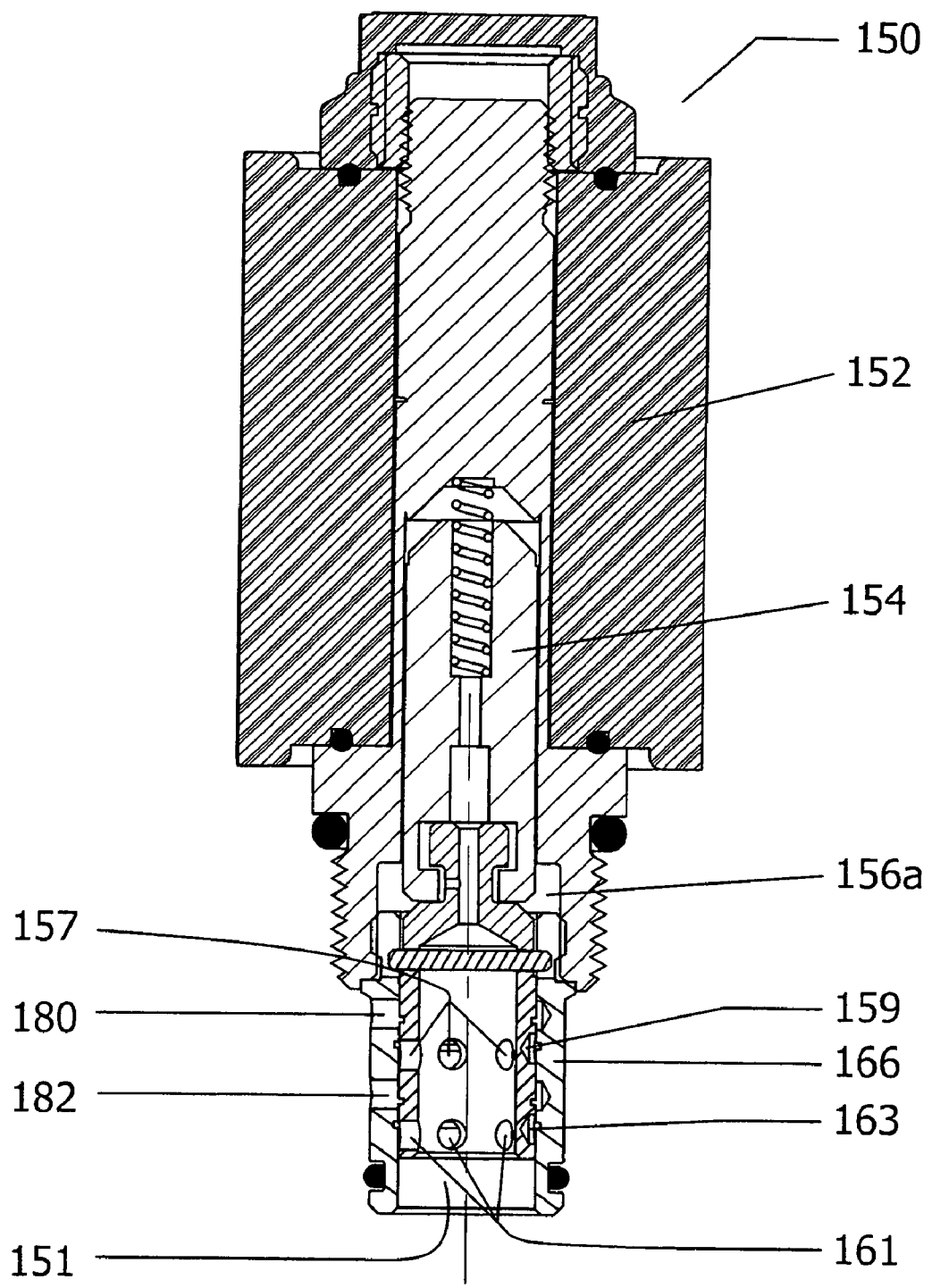
FIG. 8A is a fragmentary side elevational view of another solenoid actuated valve embodiment constructed in accordance with the present invention and illustrating circumferentially extending incremental pressure drop passages for both the cage metering and spool metering elements and showing the valve in a first or de-energized position.

Turning now to FIG. 8, and especially FIG. 8A, a valve 150 including a solenoid 152 is mounted for attracting an armature 154 coupled in a manner such as previously described to a spool 156 which is mounted for reciprocation in a cage 166. The valve is shown in its de-energized position, where fluid communication between inlet port 151 and outlet ports 180, 182 are blocked. As illustrated, a spool 156 has a plurality of upper ports 157 and lower ports 161 spaced about and through the walls of the spool 156.

Figure 8C:
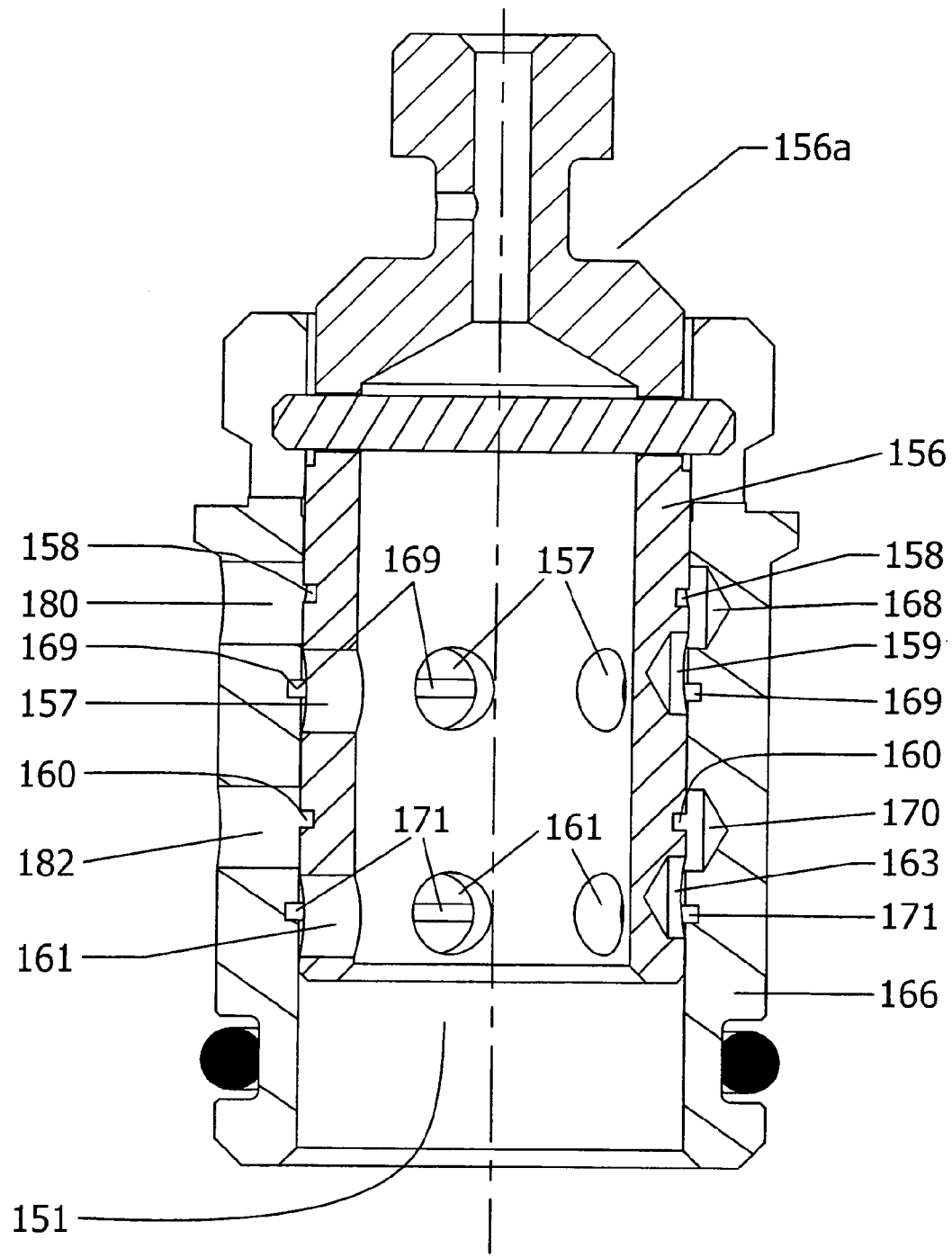
FIG. 8C is an enlarged sectional view of the cage and spool illustrated in FIGS. 8A & 8B and illustrating the valve in transition towards a second position.

Referring to FIGS. 8B, 8C and 8E, incremental pressure drop passages are provided in both the cage 166 and spool 156. To this end, the spool 156 includes a plurality of cuplike recesses 159 interdigitated between the ports or holes 157, and a lower plurality of cuplike recesses 163 intermediate or interdigitated with the spool ports 161. For purposes which will become better understood hereinafter, the exterior of the spool 156 includes fluid discharge ways, comprising in the present instance grooves 158 and 160 in a radial plane perpendicular to the central axis of the valve, and extending about the circumference of the spool 156.

As shown best in FIGS. 8C and 8E, the cage 166 also contains cuplike recesses 168 and 170 which are respectively aligned in the same radial plane as the ports 180, 182 and perpendicular to the axis of the valve 150. As with the spool, the cage 166 includes fluid discharge ways comprising in the present instance circumferentially extending grooves 169, 171, in the illustrated instance respectively below their associated recesses 168, 170, which grooves serve the dual purpose of balancing or centering and in conjunction with their associated recesses as incremental pressure drop passages.

Assuming that high pressure fluid is present at port 151, initially high pressure fluid flows and will be present within the spool 156, in the ports 157, 161 and grooves 169 and 171. High-pressure fluid will also be present in recesses 159 and 163 because of the high-pressure fluid in the grooves 171 and 169. At this point, it would be well to consider that the recesses 159, 163 in conjunction with their associated grooves 169, 171 function as balancing or centering means for the spool 156. As the valve spool 156 is transitioning upward, (note that FIG. 8C shows the valve 150 in transition) the recesses 163, 159, partially overlap the recesses 170, 168 and because of the grooves 160, 158, fluid commences flowing from the inlet port to the outlet ports 182, 180. So in this position incremental pressure drop occurs between inlet ports 161 and centering recesses 163 via grooves 171, between spool recesses 163 and cage recesses 170 via the spool 156 and cage 166 opening and finally between recesses 170 and outlet port 182 via fluid flow in groove 160. Similarly another group of incremental pressure drop passages occurs in parallel with the passages described above between inlet ports 157 and recesses 159 via groove 169, between spool recesses 159 and cage recesses 168 via the spool 156 and cage 166 openings and finally between recesses 168 and outlet ports 180 via groove 158. As the valve spool 156 continues its upward progression, the ports will permit full fluid flow from the inlet port 151 to and through the outlet ports 182, 180 via aligned inlet holes or ports 161 and 157 respectively.

As a hypothetical example to demonstrate the pressures present in the valve at the transitioning position shown in FIG. 8C, assume that initially (i.e. just prior to the spool being in the position shown in FIG. 8C) there is fluid at entry port 151 of 3,000 psi. This pressure will be reflected at the top or upper end 156a of the spool 156. This pressure will also be present in the spool 156 and at the spool ports 161, 157. This pressure will also initially be reflected in the grooves 171 and 169 and therefore also in the associated recesses 163 & 159. As the spool 156 moves upwardly to the position shown in FIG. 8C, an overlap of the recesses 163 with recess 170, and recess 159 with recess 168 occurs and allows flow to start from the spool recesses 163, 159 to cage recesses 170, 168 respectively. In this dynamic condition, because of the start in fluid flow, the pressure in the cage grooves 171, 169 may be approximately 2400 psi, the pressure in the spool recesses 163,159 may be approximately 1800 psi while the pressure in the cage recesses may be slightly lower, i.e. 1200 psi. Additionally, the pressure in the spool grooves 160, 158 will again be lower, i.e. approximately 600 psi. Since the grooves 160 and 158 intersect the significantly larger cage ports 182, 180 respectively, the pressure at those ports approaches zero. It should, of course be recognized, that as the spool 156 further transitions, the pressure at the cage outlet ports 182, 180 will approach that of the pressure at the inlet 151.

From the forgoing, it should also be recognized that the incremental pressure drop passages, in the present instance the grooves 158, 169, 160 and 171 all act as the bleed holes such as the bleed holes or apertures 35, 38 in FIG. 3; the bleed holes 58 in FIG. 4; the grooves 17 and 18 and bleed holes 87, 89 in FIG. 5; groove 113 in FIG. 6, and; the bleed holes 128a, 130a and 137a, 139a in FIG. 7. In this manner, the graph of force vs. spool stroke will be very similar to that shown in FIG. 3B. Additionally, the network of recesses and flow groove segments serve to balance the spool in the cage and act as a hydrostatic bearing for the spool. FIG. 8D is a schematic depiction of the valve illustrated in FIGS. 8A-8C and 8E.

Figure 9A:
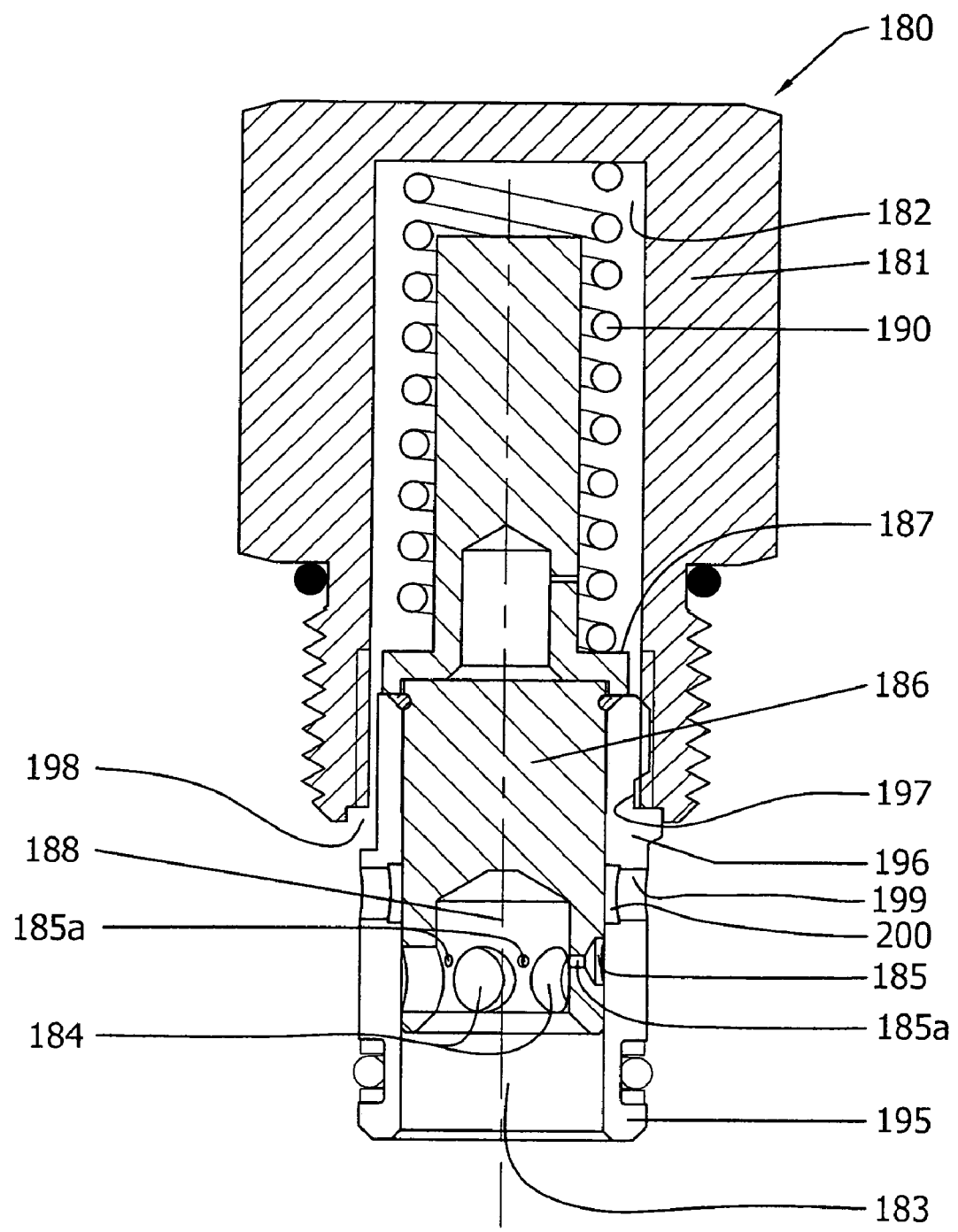
FIG. 9A is an enlarged fragmentary sectional view of a pressure actuated valve having spool metering and cage or sleeve metering with undercut holes.

FIG. 9A illustrates a pressure actuated valve (relief valve, such as a Delta Power Company modified DE-RV) 180 employing beneficially incremental pressure drop passages constructed in accordance with the present invention. In this connection, as shall be shown hereinafter, the valve 180 illustrates spool metering (port holes and recessed elements,) and utilizes cage metering including an undercut with hole like ports.

Turning now to FIGS. 9A, 9B and 9D, the valve 180 includes a cover 181 having a central, enlarged bore defining a spring housing or chamber 182 in which a spool 186 is positioned for compressing a spring 190 positioned intermediate the interior of the cover 181 in the chamber 182 and bearing on a shoulder portion 187 of the spool 186. The spool 186 is housed for reciprocation in a cage 195 which is coupled to the cover 181 as by a radially extending rim 196 and a circumferentially extending but truncated, groove 197. As shown, the truncation is effected by a relieved portion 198 on the exterior of the cage 195 to form a passage to the chamber 182 to form a passage to an outlet common with hole or port 199. As shown, the cage 195 also includes hole like ports 199, and an underlying circumferentially extending groove therein confronting the spool 186.

The spool 186 includes a central chamber 188 which is exposed to inlet pressure from the fluid inlet 183. In the walls of the chamber 188 are a plurality of fluid exit ports 184 equally spaced about the spool 186, and including incremental pressure drop passages, in the illustrated instance comprising recesses 185 interdigitated with the ports 184 but in a radial plane above the radial plane of the exit ports 184. Moreover, as has been described heretofore, each of the recesses has associated therewith fluid discharge ways, in the present instance comprising central bleed hole 185a, the purpose for which will be explained below.

In operation, as the pressure in the inlet port 183 increases, the pressure in the chamber 188 increases and the spool 186 acts like a piston under pressure and starts to compress the spring 190 against pressure in common with the outlet 199. As the spool elevates in the cage 195, the edges of the cup shaped recesses 185 intercept the edges of the ports 199 of the cage 195 via the undercut 200 and fluid commences its flow between the inlet port 183 and the outlet ports 199. Because the volume of the undercut 200 in association with the ports 199 is large as compared with the volume represented by the bleed holes 185a, fluid flow is minimal but increases rapidly with the rise of pressure at the fluid inlet 183. This kind of pressure increase, however, is more gradual than if the recesses 185 and bleed holes 185a were not present. What this means is that the parts employed for the spring return may be used for a wide range of load settings without compromising a function.

The present invention has been explained relative to valves and fluid flow therein, but may be significant under any circumstances wherein fluid flow reaction forces require greater opening (or closing) energy, i.e. dams, pumps and the like. Furthermore, the invention reduces potential oscillation or ripple effect at the metering elements of flow distribution devices that include the valve function within, for example, pumps, motors and other actuators. Additionally, the invention provides for a reduction in metering edge wear, while reducing force requirements by way of the provision for an improved flow through centering devices. Simultaneously, the invention provides for improved modulating devices of all kinds.

One will appreciate that the present disclosure is intended as an exemplification of the invention, and is not intended to limit the invention to the specific embodiment illustrated. The disclosure is intended to cover by the appended claims all such modifications as fall within the scope of the claims. While the embodiments illustrated in the various drawings described above are presently preferred, it should be understood that those embodiments are offered by way of example only. The invention is not intended to be limited to any particular embodiment but is intended to extend to various modifications thereof.

What is claimed is:

1. A fluid flow control apparatus for effecting fluid communication between ports of a device; said device comprising:
   a tubular casing having apertures therein comprising a first port located in a wall thereof;
   a moveable device mounted for reciprocation within said casing and configured to the interior shape of said casing, said moveable device having a sealing edge thereon and reciprocatable between a first and second position, and at least one port therein for registry with said first port when said moveable device is in said second position;
   at least a second port in said casing to permit fluid communication against at least one operative terminal end of said moveable device;
   an actuator for effecting reciprocation of said moveable device between said first position and said second position so that when said moveable device is in said first position fluid communication between said first and second ports is inhibited and when in said second position fluid communication between said ports is allowed;
   Incremental pressure drop passages for allowing incremental flow of fluid between said first and second ports as said moveable device is moving between at least said first and second positions to decrease the pressure differential generated force exerted on said moveable device whereby the energy applied to the actuator for moving the device between the first and second positions may be decreased; and
   wherein the pressure drop passages include at least one groove located in the movable device in a radial plane perpendicular to the central axis of the movable device and being offset from a terminal end of the movable device.

2. A fluid flow control apparatus for effecting fluid communication between ports of a device in accordance with claim 1 wherein said incremental pressure drop passages comprise a plurality of recesses in one of said casing and said moveable device, and fluid discharge ways associated with said recesses so that fluid flows through said fluid discharge ways prior to fluid communication between ports when said moveable device is in said second position.

3. A fluid flow control apparatus for effecting fluid communication between ports of a device in accordance with claim 2, wherein said fluid discharge way comprises a bleed hole in at least one of said recesses.

4. A fluid flow control apparatus for effecting fluid communication between ports of a device in accordance with claim 2, wherein said fluid discharge way comprises a groove in the other of said casing for intercepting said recess and in fluid communication with said first port.

5. A fluid flow control apparatus for effecting fluid communication between ports of a device in accordance with claim 2 wherein said plurality of recesses includes at least some in a plane perpendicular to the axis of said casing and circumferentially spaced apart from one another.

6. A fluid flow control apparatus for effecting fluid communication between ports of a device in accordance with claim 5 including a plurality of holes comprising said first port, said holes in a plane perpendicular to the axis of said casing and circumferentially spaced apart from one another.

7. A fluid flow control apparatus for effecting fluid communication between ports of a device in accordance with claim 6 wherein at least some of said recesses are in said casing, interdigitated with said plurality of holes comprising said first port.

8. A fluid flow control apparatus for effecting fluid communication between ports of a device in accordance with claim 6 wherein the port in said moveable device comprises a plurality of spaced apart holes, and at least some of said recesses are in said moveable device interdigitated with said spaced apart holes.

9. A fluid flow control apparatus for effecting fluid communication between ports of a device in accordance with claim 8 wherein said plurality of recesses include a first set of cuplike recesses in an exterior surface of movable device and a second set of cuplike recesses in an interior surface of the tubular casing, the first set of cuplike recesses being in respective fluid communication with the second set of cuplike recesses when the moveable device is between the first and second position, the first set of cuplike recesses being in fluid communication with the groove in the tubular casing, and the second set of cuplike recesses being in fluid communication with the groove in the moveable device when the moveable device is between the first and second position.

10. A fluid flow control apparatus for effecting fluid communication between ports of a device in accordance with claim 5 including recesses in both said moveable device and said casing and wherein said fluid discharge ways associated with said recesses include one of bleed holes and grooves.

11. A fluid flow control apparatus for effecting fluid communication between ports of a device in accordance with claim 5 including recesses in both said moveable device and said casing and wherein said fluid discharge ways associated with said recesses include both bleed holes and grooves.

12. A fluid flow control device for regulating fluid communication between ports of the device, said device comprising:
a tubular casing having apertures comprising a first port located circumferentially in a wall thereof;
a spool having a circumferentially extending sealing edge thereon and mounted for reciprocation within said casing between a first and second position, said spool operative in said first position to inhibit fluid communication interiorly of said casing from said first port;
at least a second port in said casing to permit fluid communication against at least one operative terminal end of said spool and a passage between opposite ends of said spool to allow balancing of said spool in said casing regardless of the pressure of the fluid at said second port when said spool is in said first position;
an actuator for moving said spool between said first position and said second position so that when said spool is in said first position fluid communication between said first and second ports is inhibited and when in said second position fluid communication between said ports is allowed;
Incremental pressure drop passages for allowing incremental flow of fluid between said first and second ports as said spool is moving between said first and second positions to decrease the pressure differential between said ports when fluid flow between said ports reaches a maximum value thereby decreasing the amount of energy necessary to be applied to the actuator for moving the spool between the first and second positions; and
wherein the pressure drop passages include at least one groove located in the spool in a radial plane perpendicular to the central axis of the spool and being offset from a terminal end of the spool.

13. A fluid flow control device in accordance with claim 12 wherein said actuator for effecting movement of said spool between a first and second position comprises the fluid upon an effective fluid lift pressure being reached.

14. A fluid flow control device in accordance with claim 12 wherein said actuator for effecting movement of said spool between a first and second position comprises a solenoid connected to said spool.

15. A fluid flow control device in accordance with claim 12 wherein said actuator for effecting movement of said spool between a first and second position includes a handle which is operatively connected to said spool for manual reciprocation of said spool.

16. A fluid flow control device for allowing fluid communication between ports; in accordance with claim 12, said device including, in said Incremental pressure drop passages, at least one groove in the casing.

17. A fluid flow control device for allowing fluid communication between ports in accordance with claim 16 wherein at least one of said grooves serves a dual purpose of centering the spool in the casing and permitting fluid communication between said ports prior to said moveable device being in said second position.

18. A fluid flow control apparatus for regulating fluid communication between ports of a device; said device comprising:
a tubular cage having a cylindrical wall with apertures therein comprising at least a first port located in said wall;
a tubular moveable device in said cage for sliding, reciprocating movement therein between a first and second position, said moveable device configured to the interior shape of said cage, and having a sealing edge thereon and a plurality of apertures therein comprising a port confronting the wall of said cage;
at least a second port in said cage to permit fluid communication against at least one operative terminal end of said moveable device;
apparatus configured to couple an actuator to said moveable device for effecting reciprocation thereof between said first position and said second position, so that when said moveable device is in said first position fluid communication between said first and second ports is inhibited and when in said second position fluid communication between said ports is allowed via the port in said moveable device;

Incremental pressure drop passages for allowing incremental flow of fluid between said first and second ports as said moveable device is moving between said first and second positions to decrease the pressure differential generated force exerted on said moveable device whereby the energy applied to the actuator for moving the device between the first and second positions may be decreased; and wherein the pressure drop passages include at least one groove located in the tubular movable device in a radial plane perpendicular to the central axis of the tubular moveable device and being offset from a terminal end of the tubular movable device.

19. A fluid flow control apparatus for effecting fluid communication between ports of a device in accordance with claim 18 wherein said incremental pressure drop passages comprise a plurality of recesses in one of said moveable device and cage, and a plurality of fluid discharge ways associated with said recesses so that fluid flows from said fluid discharge mean prior to unimpeded fluid communication between ports when said moveable device is in said second position.

20. A fluid flow control apparatus for effecting fluid communication between ports of a device in accordance with claim 19 wherein said plurality of recesses includes at least some in a plane perpendicular to the axis of said cage and circumferentially spaced apart from one another.

* * * * *